US012135855B2

(12) United States Patent
Deng et al.

(10) Patent No.: US 12,135,855 B2
(45) Date of Patent: Nov. 5, 2024

(54) ELECTRONIC DEVICE HAVING A BIOMETRIC INPUT SYSTEM INCLUDING A COMPOSITE COVER ELEMENT

(71) Applicant: Apple Inc., Cupertino, CA (US)

(72) Inventors: Andrew Deng, San Jose, CA (US); Timothy D. Koch, San Jose, CA (US); Hui-Shan Chang, Taoyuan (TW); Andrew W. Joyce, San Jose, CA (US); Henry H. Yang, Cupertino, CA (US); Ran Xu, Cupertino, CA (US); Patrick E. O'Brien, Pleasanton, CA (US); Yu Hsuan Chao, New Taipei (TW); Dale Setlak, Merritt Island, FL (US); Giovanni Gozzini, Berkeley, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/202,620

(22) Filed: May 26, 2023

(65) Prior Publication Data

US 2023/0418421 A1 Dec. 28, 2023

Related U.S. Application Data

(60) Provisional application No. 63/356,447, filed on Jun. 28, 2022.

(51) Int. Cl.
*G06F 3/044* (2006.01)
*G06F 3/041* (2006.01)

(52) U.S. Cl.
CPC ........ *G06F 3/0445* (2019.05); *G06F 3/04144* (2019.05)

(58) Field of Classification Search
CPC .... G06F 3/0445; G06F 3/04144; G06F 3/041; G06F 3/0202
See application file for complete search history.

(56) References Cited

U.S. PATENT DOCUMENTS

| | | | |
|---|---|---|---|
| 10,866,619 B1 * | 12/2020 | Bushnell | G06F 1/169 |
| 2015/0071510 A1 * | 3/2015 | Kim | G06V 40/1306 382/124 |
| 2017/0091515 A1 | 3/2017 | Cao et al. | |
| 2018/0054313 A1 * | 2/2018 | Wu | H04M 1/026 |
| 2018/0173922 A1 * | 6/2018 | Ghavanini | G06V 40/1306 |

OTHER PUBLICATIONS

Chao et al., "The Effects of Filler Shape, Type, and Size on the Properties of Encapsulation Molding Components," Electronics, 10, 98, 11 pages, 2021.
Huang et al., "The Toxicity of Nanoparticles Depends on Multiple Molecular and Physicochemical Mechanisms," International Journal of Molecular Sciences, 18, 2702, 2017.

* cited by examiner

*Primary Examiner* — Premal R Patel
(74) *Attorney, Agent, or Firm* — Brownstein Hyatt Farber Schreck, LLP

(57) ABSTRACT

A biometric input system for an electronic device is provided. The biometric input system may be a fingerprint sensing system. The biometric input system includes a biometric sensing component, which may be a capacitive sensing component. The biometric input system also includes a composite cover element, which may be a dielectric cap or coating, and the biometric sensing component is capable of receiving a biometric input from a user through the composite cover element. Electronic devices including the biometric input system are also provided.

20 Claims, 14 Drawing Sheets

ELECTRONIC DEVICE HAVING A BIOMETRIC INPUT SYSTEM INCLUDING A COMPOSITE COVER ELEMENT

CROSS-REFERENCE TO RELATED APPLICATION(S)

This application is a nonprovisional application of and claims the benefit of U.S. Provisional Patent Application No. 63/356,447, filed Jun. 28, 2022, and titled "Electronic Device Having a Biometric Input System Including a Composite Cover Element," the disclosure of which is hereby incorporated herein by reference in its entirety.

FIELD

The described embodiments relate generally to a biometric input system, such as a biometric key or button, for an electronic device. More particularly, the present embodiments relate to a biometric input system that includes a biometric sensing component and a composite material at least partially covering the biometric sensing component and defining an input surface.

BACKGROUND

Some electronic devices include sensors or electronics for detecting a touch or other input. However, these sensors may be formed from materials or elements that may not be suitable for external surfaces of some electronic devices. Additionally, traditional coatings or protective layers may interfere with the operation of the sensor and degrade or inhibit the sensor performance.

SUMMARY

The disclosure provides a biometric input system for an electronic device that includes a biometric sensing component and a composite cap. The biometric sensing component can sense a biometric input from a user through the composite cap. In some cases, the biometric input system may be configured to receive both a biometric input and a conventional force-based input (e.g., a touch input or a press input). Electronic devices including a biometric input system are also disclosed.

In some examples, the composite cap may be defined by a coating of a composite material disposed over the biometric sensing component. In other examples, the composite cap is formed and then attached to the biometric sensing component. The composite material may be a dielectric material, so that the composite cap is a dielectric cap.

The composite cap may be formed from a composite material that differs from conventional molding compounds used for encapsulating electronic components. In some cases, a size of particles in the composite material is smaller than a size of filler materials used in some conventional molding compounds. The fine particles in the composite material described herein can help provide a more homogeneous medium through which the biometric sensing component can sense the biometric input. In some cases, the composite material may include pigment particles that are different than those used in some conventional molding compounds.

To provide strength and scratch resistance to the composite cap, the particles may be formed of an abrasion resistant material that has suitable dielectric properties, such as a metal oxide or a silicon oxide (e.g., silicon dioxide or silica). The composite material may include a high loading of these particles, such as 80% to 90% by weight, in a polymer binder, in order to provide the desired mechanical and dielectric properties to the composite material. The composite material may also include pigment particles in order to provide a desired color.

The biometric input system may serve as a bio-authentication system for authorization of a user. Once the user is authenticated through the biometric input system (and optionally after receiving a force-based input through the biometric input system), the device may take an action such as unlocking the device, activating a display of the device, opening or launching an application, initiating a payment, or the like.

In some cases, the biometric input system is a fingerprint-sensing system and the biometric sensing component is a fingerprint sensing component. In some examples, the fingerprint sensing component includes a capacitive sensing component and the composite cap is a dielectric cap. In some cases, the dielectric particles may have a size less than one micrometer in order to provide a sufficiently uniform dielectric permeability across sensor elements of the capacitive sensing component.

In embodiments, the biometric input system includes a biometric button assembly that in turn includes a package including the biometric sensing component and a composite material at least partially encapsulating one or more sensor elements of the biometric sensing component. The composite material defines a cap of the biometric button assembly. The biometric button assembly may further comprise a carrier structure that supports the package. In some cases, the carrier structure is configured to translate in response to a user press input. In other cases, the carrier structure may remain substantially stationary in response to the user press input.

In embodiments, the disclosure provides an electronic device comprising: an enclosure, a display positioned within the enclosure, and a biometric button assembly positioned along a side of the display. The biometric button assembly comprises a carrier structure configured to translate in response to a user press input, a switch assembly configured to detect a translation of the carrier structure in response to the user press input, a biometric sensing component coupled to the carrier structure and comprising an array of sensing elements configured to sense a fingerprint in response to the user press input, a dielectric coating at least partially encapsulating the array of sensing elements of the biometric sensing component, defining an input surface for the biometric button assembly, and formed from a composite material comprising oxide particles having a mean particle size greater than or equal to 50 nm and less than 1 micrometer and a binder comprising a thermoset polymer material.

In additional embodiments, the disclosure provides an electronic device comprising an enclosure defining an opening, a bio-authentication button assembly positioned at least partially within the opening. The bio-authentication button assembly comprises a capacitive sensing component defining a component surface, a cap defining a touch input surface and disposed over the component surface, the cap formed from a composite material comprising dielectric particles having a mean particle size greater than or equal to 50 nm and less than or equal to 500 nm and a binder comprising a dielectric polymer material. The electronic device further comprises a processor positioned within the enclosure, operatively coupled to the capacitive sensing component, and configured to authenticate a user based on an output of the capacitive sensing component.

In further embodiments, the disclosure provides an electronic device comprising a housing defining an opening along a side surface of the electronic device and a touch-sensitive biometric button assembly extending through the opening, and a switch assembly positioned inward of the touch-sensitive biometric button assembly and configured to detect a user press input. The touch-sensitive biometric button assembly comprises a biometric sensing component including a sensing layer, an exterior package layer defining an input surface of the touch-sensitive biometric button assembly, at least partially encapsulating an outward-facing surface of the biometric sensing component, and formed from a dielectric material comprising 80% to 95% by weight of oxide particles having a mean particle size greater than or equal to 50 nm and less than or equal to 500 nm and 5% to 20% by weight of a binder comprising a thermoset polymer material.

BRIEF DESCRIPTION OF THE DRAWINGS

The disclosure will be readily understood by the following detailed description in conjunction with the accompanying drawings, wherein like reference numerals designate like elements.

Figure 1A:
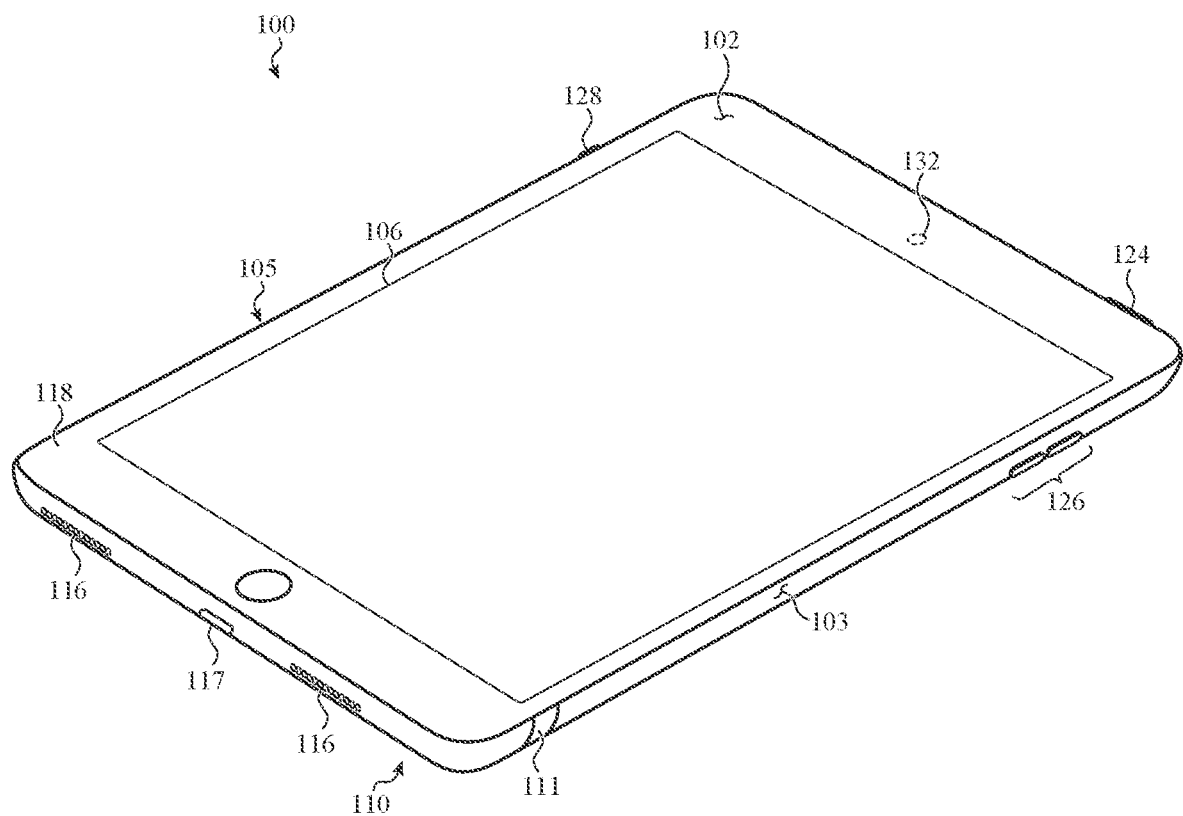
FIG. 1A shows the front of an electronic device including a biometric input system.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred implementation. To the contrary, the described embodiments are intended to cover alternatives, modifications, and equivalents as can be included within the spirit and scope of the disclosure and as defined by the appended claims.

The disclosure provides a biometric input system for an electronic device that includes a composite cover, which may also be referred to herein as a composite cap or composite coating. The biometric input system may include a biometric sensing component that can receive a biometric input from a user through the composite cap. In some cases, the biometric input system may be configured to receive both a biometric input and a conventional force-based input (e.g., a touch input or a press input). Electronic devices including the biometric input system are also disclosed.

In some examples, the composite cap may be defined by a coating of a composite material disposed over the biometric sensing component. In other examples, the composite cap is formed and then attached to the biometric sensing component. The composite material may be a dielectric material, so that the composite cap is a dielectric cap. A dielectric cap may be defined by a dielectric coating formed from a dielectric composite material.

The composite cap may be formed from a composite material that differs from conventional molding compounds used for encapsulating electronic components. In some cases, a size of particles in the composite material is smaller than a size of filler materials used in some conventional molding compounds. The fine particles in the composite materials described herein can help provide a more homogeneous medium through which the biometric sensing component can sense the biometric input.

To provide strength and scratch resistance to the composite cap, the particles may be formed of an abrasion resistant material that has suitable dielectric properties. In some cases, the abrasion resistant material is a metal oxide such as a metal oxide or a silicon oxide. The composite material may include a high loading of these particles in a polymer binder, such as 80% to 90% by weight, in order to provide the desired mechanical and dielectric properties to the composite material. The composite cap may also include pigment particles in order to provide a desired color.

The biometric input system may serve as a bio-authentication system for authorization of a user. The biometric input system may authenticate a user for operation of the device. Once the user is authenticated through the biometric input system (and optionally after receiving a force-based input through the biometric input system), the device may take an action such as unlocking the device, activating a display of the device, opening or launching an application, initiating a payment or purchase, or the like. The biometric input system may function as a power button that powers the device on or off, a sleep/wake button that puts the device into a sleep state or awakens the device from the sleep state or combinations of these.

The biometric sensing component may use any of a number of sensing techniques. In some embodiments, the biometric sensing component relies on an electric field sensing technique. A capacitive sensing technique may be an example of an electric field sensing technique. In additional embodiments, the biometric sensing component relies on another sensing technique such as an ultrasonic sensing technique, an optical sensing technique, or the like. In some cases, the biometric sensing component is a semiconductor die that includes a sensing layer. The sensing layer may be an electric field sensing layer, a capacitance sensing layer, or a sensing layer that relies on another sensing technique. The sensing layer may include a plurality of sensing elements. The sensing elements may be electric field sensing elements. In some embodiments, the sensing elements are capacitive sensing elements, which may be an example of electric field sensing elements. In some cases, the output signal from a given electric field sensing element may be affected by the distance between the electric field sensing element and a feature of a user's fingerprint, such as a ridge or a valley of the fingerprint.

In some cases, the biometric input system is a fingerprint-sensing system and the biometric sensing component is a fingerprint sensing component. In some examples, the fingerprint sensing component includes a sensing layer and the composite cap is a dielectric cap. The sensing layer may be an electric field sensing layer, a capacitive sensing layer, or may use another sensing technique described herein. In some cases, the dielectric particles may have a size less than one micrometer in order to provide a sufficiently uniform dielectric permeability to allow good fingerprint sensing performance through the composite material layer through a composite cap thickness of 120 micrometers or more. For example, the composite cap can provide sufficiently uniform dielectric permeability across an array of sensing elements of the sensing layer. As previously described, the sensing elements may be electric field sensing elements, which in some cases may be capacitance sensing elements. The size of the dielectric particles may be characterized by an average diameter.

In embodiments, the biometric input system includes a biometric button assembly that, in turn, includes the package including the biometric sensing component and a composite material at least partially encapsulating one or more sensor elements of the biometric sensing component. The composite material defines a cap of the biometric button assembly. The biometric button assembly may further comprise a carrier structure that supports the package. In some cases, the carrier structure is configured to translate in response to a user press input. In other cases, the carrier structure may remain substantially stationary in response to a touch or press input.

The composite caps for biometric input systems described herein can have advantages as compared to conventional covers such as sapphire covers. For example, because a pigment can be incorporated into the composite cap the desired coloration of the composite cap can be achieved without the need for one or more cosmetic layers such as an ink layer, a paint layer, a thin film stack, or the like. Therefore, the process for forming the composite cap can be simplified by omitting one or more operations to form the cosmetic layer(s). Furthermore, the coloration of a cap including pigment particles dispersed within the cap can be more resistant to wear than a cosmetic layer applied to an external surface of the cap. The process for forming the composite cap can also be simpler than a process for forming a sapphire cover in other respects, as well as providing cost savings in input materials.

These and other embodiments are discussed below with reference to FIGS. 1A-12. However, those skilled in the art will readily appreciate that the detailed description given herein with respect to these figures is for explanatory purposes only and should not be construed as limiting.

FIG. 1A shows the front of an electronic device 100. The electronic device of FIG. 1A may be a tablet computer or a phone. However, the concepts presented herein may apply to any appropriate electronic device including a wearable device such as a smartwatch, a laptop computer, a handheld gaming device or any other electronic device that includes a biometric input system.

As shown in FIG. 1A, the electronic device 100 includes an enclosure 105 that includes a housing 110 and a front cover 118. The front cover 118 may define at least a portion of the front surface 102 of the electronic device 100. The front cover 118 may be positioned over a display 106 and at least a portion of the front cover 118 may be transparent to define a transparent window for the display 106. The front cover 118 may be coupled to the display 106 and in some cases may be integrated with or coupled to a touch sensor that is configured to detect or estimate a location of a touch along an exterior surface of the front cover 118. In some examples, the front cover 118 may be formed from a glass, a glass ceramic, a transparent ceramic such as sapphire, plastic, or combinations thereof. The glass of the front cover 118 may be chemically strengthened through ion exchange.

Figure 1B:
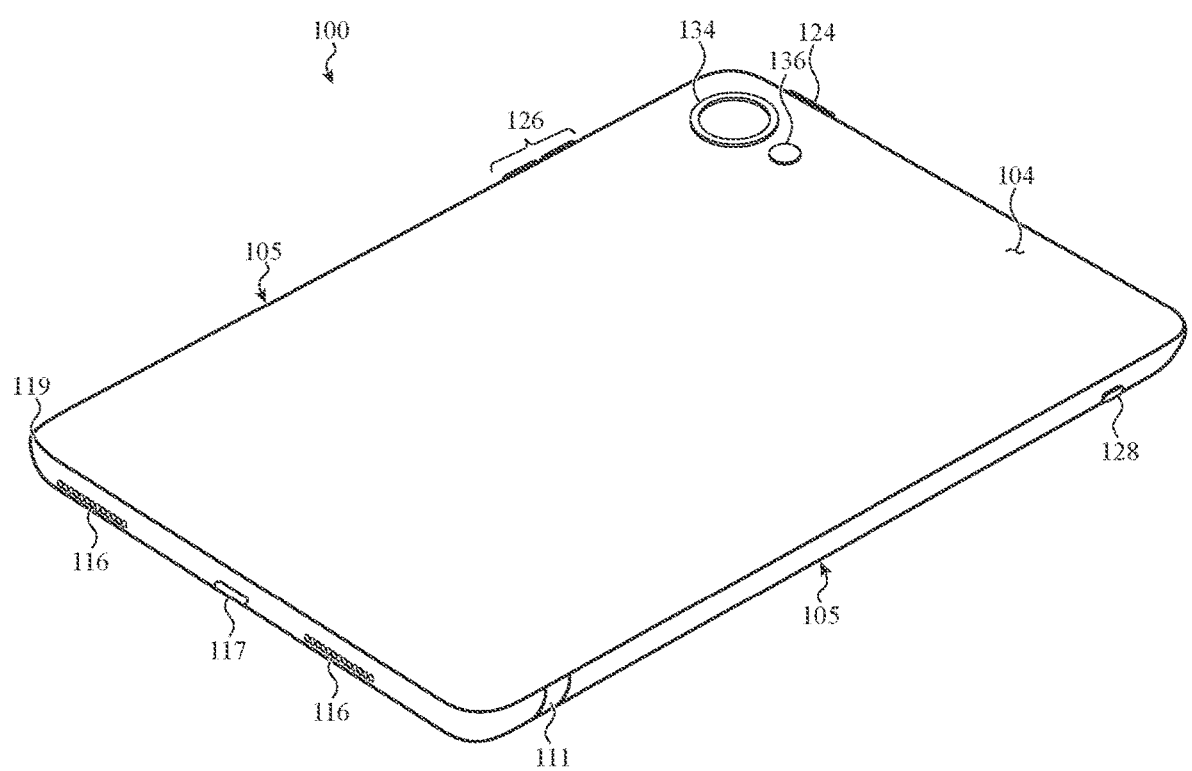
FIG. 1B shows the rear of an electronic device including a biometric input system.

In the example of FIG. 1B, the enclosure 105 also includes a rear cover 119. The rear cover 119 may define at least a portion of the rear surface 104 of the electronic device 100. In some examples, the rear cover 119 may be formed from a glass, a glass ceramic, a transparent ceramic such as sapphire, plastic, a metal, or combinations thereof. The glass of the rear cover 119 may also be chemically strengthened through ion exchange. The rear cover 119 may be transmissive to one or more frequency ranges of an internal antenna or an internal charging unit. When the rear cover is transparent to optical frequencies, an opaque coating may be provided along an interior of the rear cover to obscure internal components from view. In some cases, the housing 110 may define the rear cover 119, so that the housing 110 defines the side surfaces and the back wall of the device 100.

As shown in the example of FIGS. 1A and 1B, the housing 110 at least partially defines a side surface 103 of the electronic device 100. The housing 110 also at least partially encloses or surrounds the display 106. Each of the front cover 118 and the rear cover 119 may be coupled to the housing. The housing may include one or more metal members, one or more glass members, one or more glass ceramic members, one or more ceramic members, or combinations of these. In some cases, the housing 110 is formed from a series of metal segments that are separated by dielectric that provide electrical isolation between adjacent metal segments. For example, a dielectric segment (e.g., 111) may be provided between a pair of adjacent metal segments. One or more of the metal segments may be coupled to internal circuitry of the electronic device 100 and may function as an antenna for sending and receiving wireless communication. The dielectric segments may be formed from one or more dielectric materials such as a polymer, a glass, or a ceramic material.

The housing may define one or more openings or ports, such as the openings 116 and 117. The opening 116 may allow (audio) input or output from a device component such as a microphone or speaker. The opening 117 may contain an electrical port or connection. The housing 110 may also define one or more openings to accommodate one or more input devices. For example, an input device in the form of a button may extend into an opening in the housing 110 and in some cases may be flush or proud of the housing 110.

The electronic device 100 may include multiple input devices as shown in the example of FIGS. 1A and 1B. The input devices may be used to control various operations and functions of the device 100. In some cases, the input device 124 is a biometric input system, such as a fingerprint button or another type of biometric-sensing button. In the example of FIGS. 1A and 1B, the biometric input device 124 is positioned along a side surface of the electronic device 100. Therefore, the biometric input device 124 may be described as being positioned along a side of the display 106. Each of the buttons 126 and 128 may be operative to control a feature such as speaker volume, silencing of a ring tone, forwarding a call, or the like. Each of the buttons 126 and 128 are also generally positioned along a side surface of the electronic device, although they are positioned on opposite sides in the examples of FIGS. 1A and 1B.

The biometric input system of the input device 124 includes a biometric sensing component. In some examples, the biometric sensing component may be configured to capture an image of a fingerprint of a user to authenticate the user. For example, the biometric sensing component, along with other components of a fingerprint sensing system, may detect physical characteristics of a user's fingerprint, such as the ridges and valleys and/or other patterns of a fingerprint. In some cases, the biometric sensing component relies on electric field sensing and may be referred to as an electric field sensing component. In some examples, the biometric sensing component is a capacitive sensing component. In other cases, the biometric sensing component relies on another sensing technique such as an ultrasonic sensing technique, an optical sensing technique, or the like. The biometric sensing component may be configured to sense a fingerprint in response to a touch or a press input from a user.

In embodiments, the biometric sensing component is at least partially encased by a package (e.g., the packages 342 and 442 of FIGS. 3 and 4) that includes a composite material as described herein. An outer layer of the package formed from the composite material may define a cap for the biometric input system. The outer layer of the package may be defined by a dielectric coating. The package may also include one or more other components of the biometric input system, such as a circuit layer, a circuit component (e.g., a processor) operatively coupled to the biometric sensing component, or a passive component. The cross-sectional views of FIGS. 6B-10 show examples of the types and configurations of components that may be included in the package.

The biometric sensing component may define a component surface and the cover element may be disposed over the component surface. The component surface may be a surface along which input may be provided to pixels or sensing elements of the biometric sensing component. In embodiments, the component surface is an outward-facing surface (e.g., facing an exterior surface) of the biometric sensing component and the composite cap is generally disposed over the outward facing surface. Therefore, the composite cap may define an outer face of the biometric button assembly. The composite cap may be formed from a composite material that differs from conventional materials used for encapsulating electronic devices. For example, the size of the particles in the composite material may be smaller than the micrometer-sized filler materials used in some conventional molding compounds. For example, the particles in the composite material may have a size less than one micrometer. In some cases, the size may be characterized by the average diameter of the particles. The average diameter may be determined from a number, a mass, or a volume distribution.

Figure 6A:
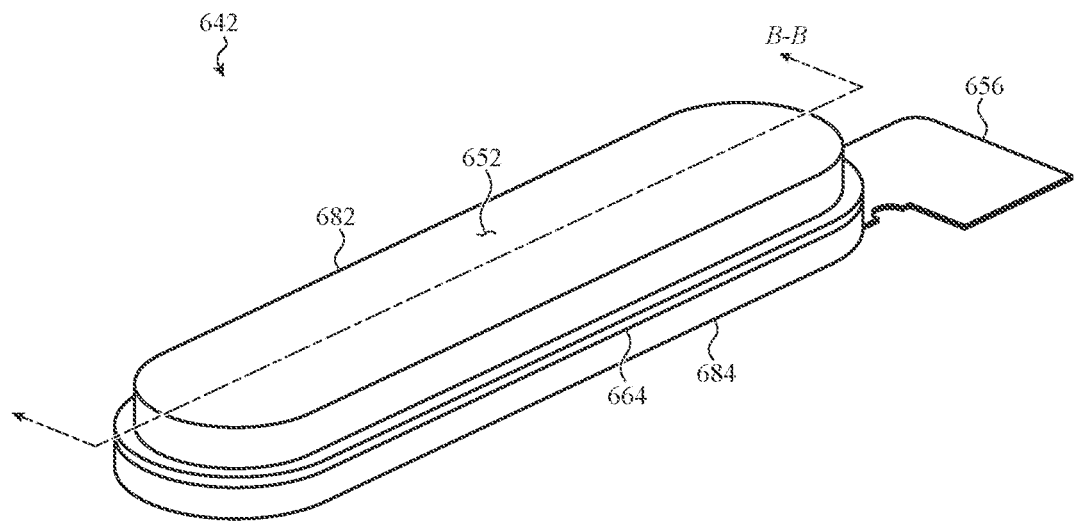
FIG. 6A shows an example of a package for a biometric input system.
Figure 6B:
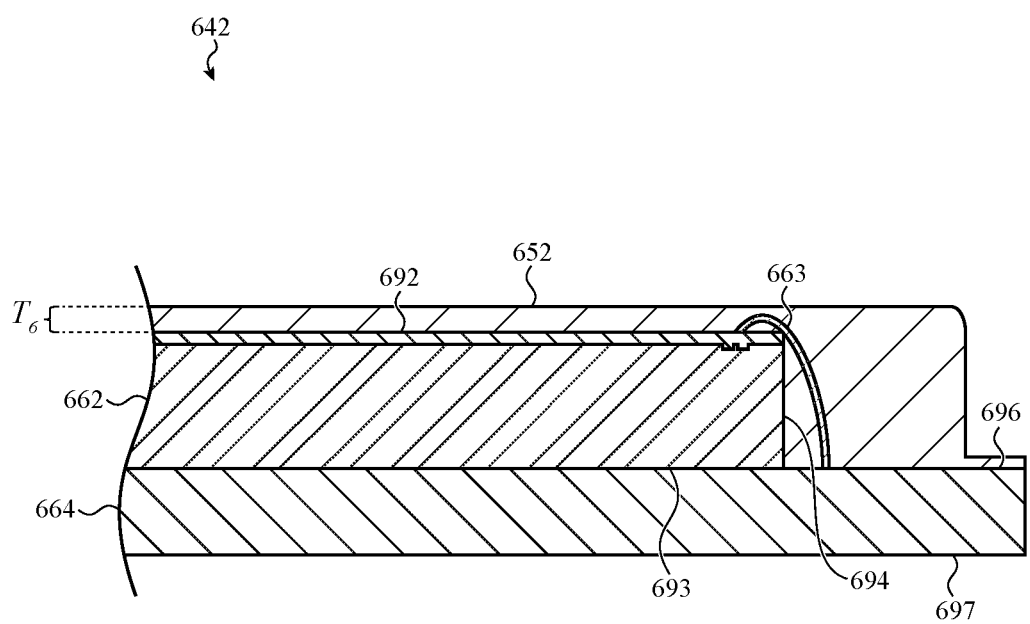
FIG. 6B shows an example of a partial cross-sectional view of a package for a biometric input system.

To provide strength and scratch resistance to the composite cap, the particles may be particles of an abrasion resistant material having suitable dielectric properties. In some cases, the abrasion resistant material is a metal oxide such as a metal oxide or a silicon oxide. The composite material may include a high loading of these particles in a polymer binder, such as 80% to 90% by weight or 80% to 95% by weight, in order to provide the desired mechanical properties and dielectric properties to the composite cap. The composite cap may also include pigment particles in order to provide a desired color. In some cases, the composite cap may be free of a coating that is configured to provide a color to the cap. However, the composite cap may include one or more of an oleophobic coating, an anti-static coating, or the like. The additional description of composite materials provided with respect of FIGS. 6A and 6B is generally applicable herein and is not repeated here.

In embodiments, the biometric input system includes a biometric button assembly. In some cases, the biometric button assembly is a bio-authentication button assembly. The biometric button assembly in turn may include a package including the biometric sensing component and a composite material at least partially encapsulating one or more sensor elements of the biometric sensing component. The composite material defines a cover element or "cap" of the biometric button assembly. The biometric button assembly may further comprise a carrier structure that supports the package. In some cases, the carrier structure is configured to translate (i.e., move) in response to a user press input. In other cases, the carrier structure may remain stationary.

The biometric input system may further include one or more components such as an input sensor which allows the biometric input system to be sensitive to a touch or a press input from a user. In some cases, the biometric input system also includes a compressible assembly that is configured to compress in response to a force input from a user (e.g., a press input). The compressible assembly may be coupled to the carrier structure and configured to transfer an input force applied to the composite cap to the input sensor. Description of these additional components of the biometric input system is provided with respect to FIG. 5 and is not repeated here.

As shown in FIGS. 1A and 1B, the device 100 includes a front-facing optical assembly 132 and rear facing optical assemblies 134 and 136. The optical assembly may be part of a sensor assembly, a camera assembly, or the like. For example, the front-facing optical assembly 132 may be a front facing camera assembly. The rear facing optical assembly 134 may be a rear facing camera assembly. The rear facing optical assembly 136 may be a flash. These examples are not limiting and in additional examples an optical assembly may include multiple optical components, such as multiple camera components, multiple sensor components, or a combination of camera and sensor components. Sensor assemblies, sensor arrays, and camera assemblies are described in further detail respect to FIG. 12 and that description is not repeated here.

Figure 12:
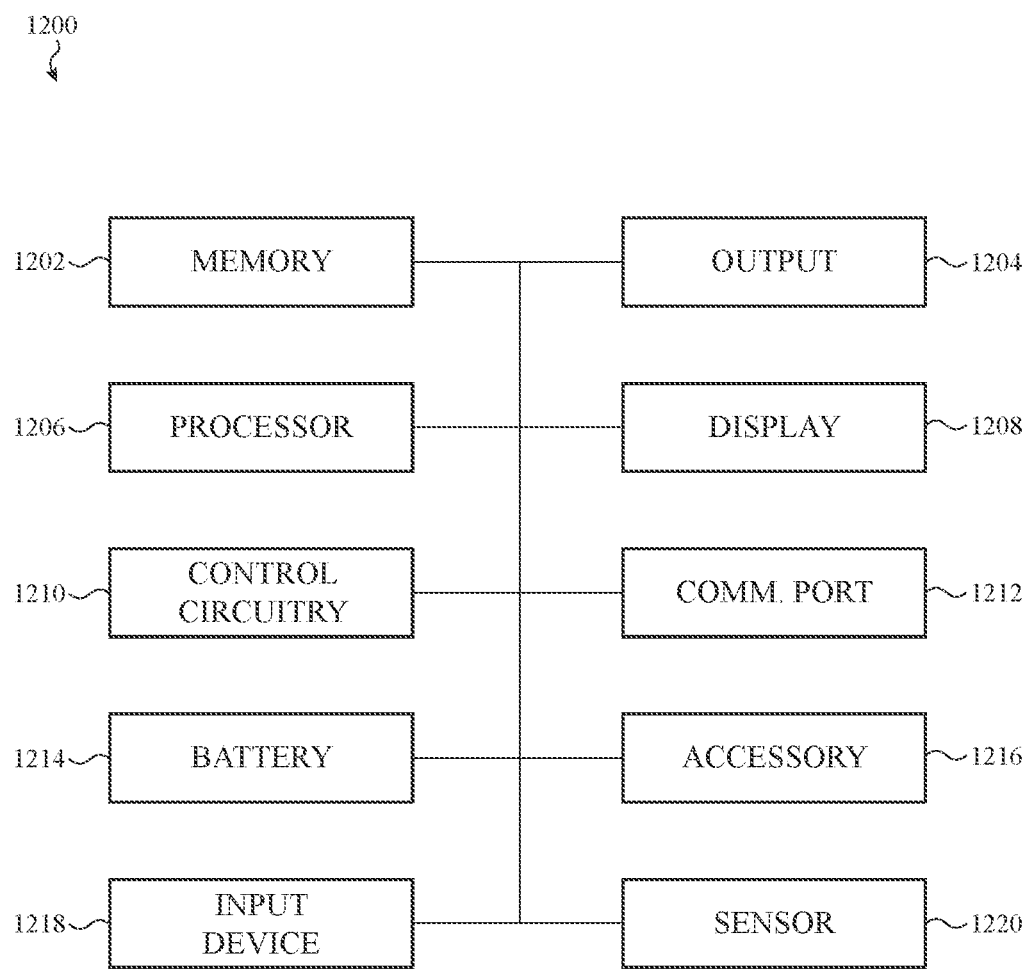
FIG. 12 shows a block diagram of an example electronic device.

The electronic device 100 may comprise one or more of a processing unit, control circuitry, a display, memory, an input/output device, a power source (e.g., a battery), a charging assembly (e.g., a wireless charging assembly), a network communication interface, an accessory (e.g., a camera), and a sensor. Components of a sample electronic device are discussed in more detail below with respect to FIG. 12 and the description provided with respect to FIG. 12 is generally applicable herein. The description provided with respect to FIGS. 1A and 1B is generally applicable herein.

Figure 2:
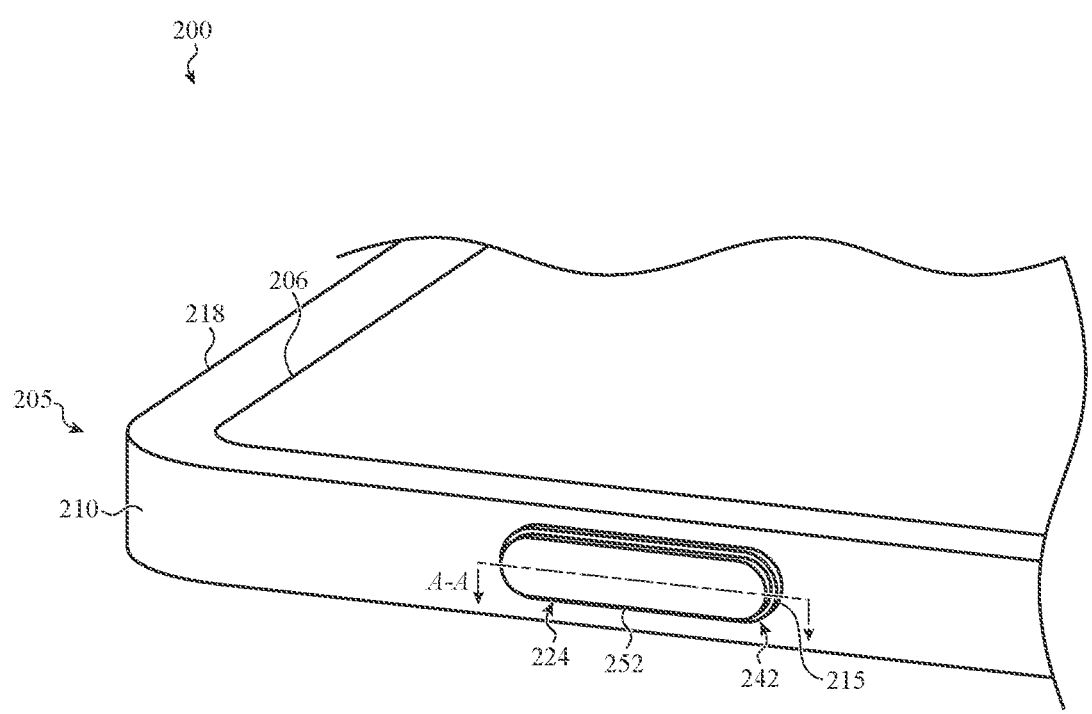
FIG. 2 shows a detail view of the biometric input system of the device of FIGS. 1A and 1B.

FIG. 2 shows a detail view of a biometric input system 224 of an electronic device 200. The biometric input system 224 may be an example of the biometric system 124 of FIGS. 1A and 1B and, in some cases, may be a fingerprint-sensing system. The biometric input system 224 includes an input surface 252 through which a user may provide biometric input to the biometric sensing component.

As previously discussed with respect to FIGS. 1A and 1B, in some embodiments the biometric sensing component is at least partially encased by the composite material to form a package 242. In some cases, an outer layer of the package 242 is formed from the composite material and at least partially defines the input surface 252. This outer layer, which may also be referred to as an outward-facing or an exterior layer, may define a cover element or "cap" for the biometric input system. As shown in the example of FIG. 2, the package defines an outward-facing surface having an elongated shape. The elongated shape shown in the example of FIG. 2 has generally parallel sides and rounded ends, which may be referred to as a lozenge shape. In additional examples, the elongated shape may be an oval shape or a rectangular shape with rounded corners.

As described in greater detail with respect to the cross-sectional views of FIGS. 6B-10, the outer layer of the package 242 may encapsulate an outward-facing surface of the biometric sensing component and, in some cases, may also encapsulate a side surface of the biometric sensing component. The description of packages including a biometric sensing component provided with respect to FIGS. 6B—10 is generally applicable herein and is not repeated here. The electronic device 200, the enclosure 205, the housing 210, the front cover 218, and the display 206 may be similar to the electronic device 100, the enclosure 105, the housing 110, the front cover 118, and the display 106 and those details are not repeated here.

Figure 5:
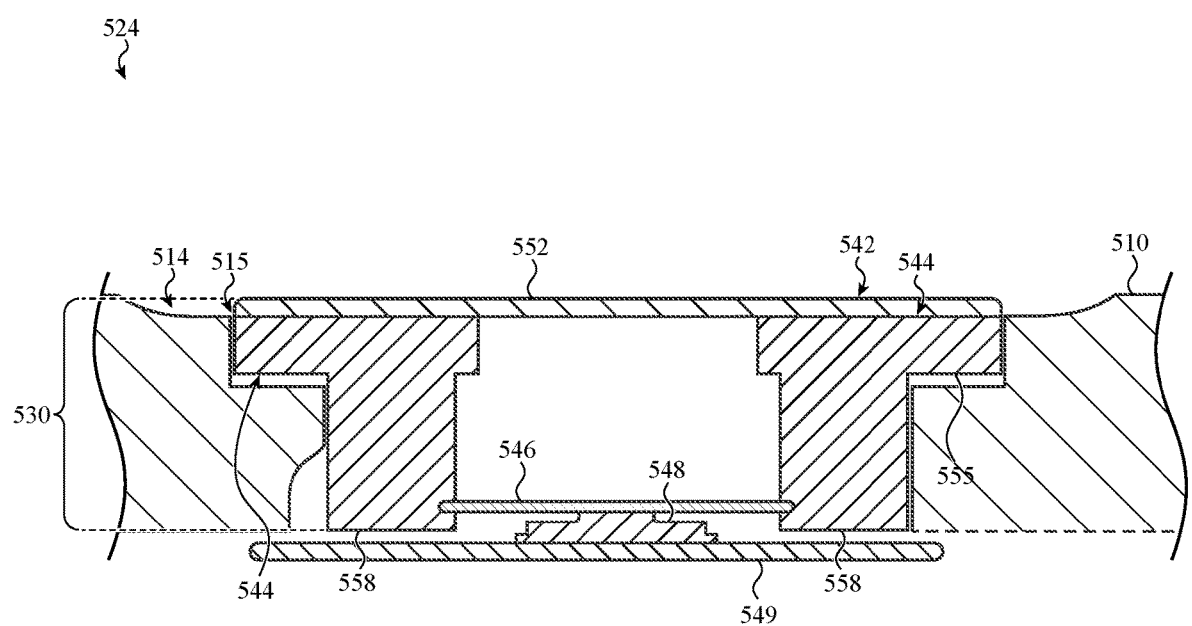
FIG. 5 shows a partial cross-sectional view of a portion of a biometric input system.

At least a portion of the biometric input system may extend into an opening 215 in the housing 210 (as shown in the cross-sectional view of FIG. 5). In some embodiments, the input surface 252 is proud of a neighboring exterior surface of the housing 210 while in other embodiments, the input surface 252 is substantially flush or slightly recessed with respect to the neighboring exterior surface of the housing 210.

Figure 3:
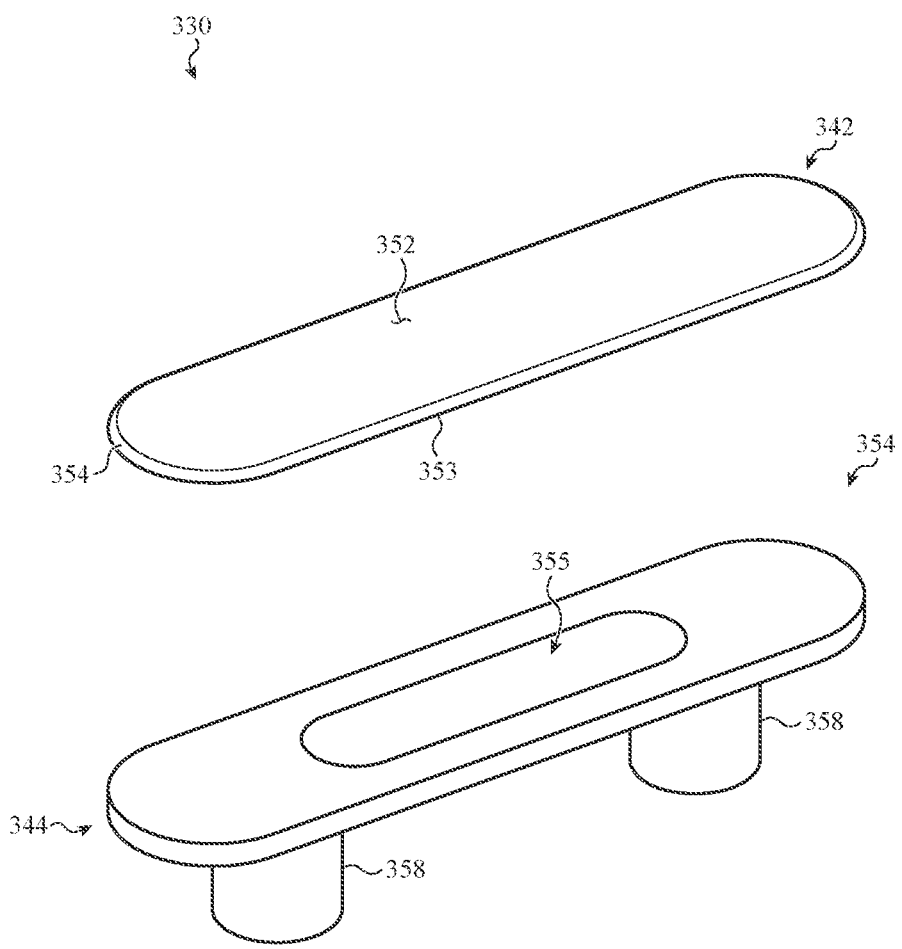
FIG. 3 shows a partial exploded view of an example biometric button assembly.

FIG. 3 shows a partial exploded view of an example biometric button assembly 330. The biometric button assembly 330 may be part of a biometric input system as previously described with respect to FIGS. 1A, 1B, and 2. As shown in FIG. 3, the biometric button assembly 330 includes a package 342 and a carrier structure 344.

In embodiments, the package 342 includes a biometric sensing component that is at least partially encased by a composite material as described herein. An outer layer of the package may be formed of this composite material and define an input surface 352 for the biometric input system. The outer layer of the package may also be referred to herein as an outward-facing layer or as an exterior layer. The composite material may therefore form a composite cap (alternately, cover) for the biometric button assembly. In some cases when the input surface 352 protrudes from an opening in the housing, the outer surface and at least a portion of the side surface of the biometric sensing component may also protrude from the opening. The package 342 also defines a lower surface 353. The package may also include one or more other components of the biometric input system, such as a circuit layer, a circuit component (e.g., a processor) operatively coupled to the biometric sensing component, or a passive component. The cross-sectional views of FIGS. 6B-10 show examples of the types and configurations of components that may be included in the package and the description provided with respect to FIGS. 6B-10 is generally applicable herein. The packages described herein can have advantages over traditional molded packages due to use of the composite materials described herein in the package. The packages described herein can also have a shape that can include a low draft angle, which can produce a relatively sharp transition between surfaces.

The carrier structure 344 is typically coupled to the package 342. For example, a region of the lower surface 353 of the package 342 may be coupled to the carrier structure 344 by an adhesive. The carrier structure 344 may be formed of an electrically conductive material, such as a metal (including a metal alloy) and may therefore be referred to as a conductive carrier structure. In some cases, the carrier structure 344 may be conductively coupled to a circuit ground. In other cases, a voltage may be applied between the carrier structure 344 and a circuit ground. In some embodiments the carrier structure 344 may be substantially stationary in response to input from a user while in other embodiments the carrier 344 may translate in response to the input from the user.

In the example of FIG. 3, the carrier structure 344 includes a frame portion 354. The frame portion 354 may define an opening 355 and the package 342 may span the opening 355. In the example of FIG. 3, an entirety of the frame portion 342 is positioned inward from (alternately, underneath) the package 342. The carrier structure 344 also includes multiple protruding features (e.g., bosses) 358 coupled to the frame portion 342. In some cases, the frame portion 342 and the protruding features 358 may be formed as an integral piece. The protruding features may be coupled to additional portions of the biometric system. For example, the protruding features may be coupled to a compressible assembly configured to transfer an input force applied to the input surface 352 to an input sensor. In other examples, the carrier structure 344 may have a different form, such as the form of the carrier structure 444, a form that omits the protruding portions 358, or a form that has protruding features shaped differently than shown in FIG. 3.

Figure 4:
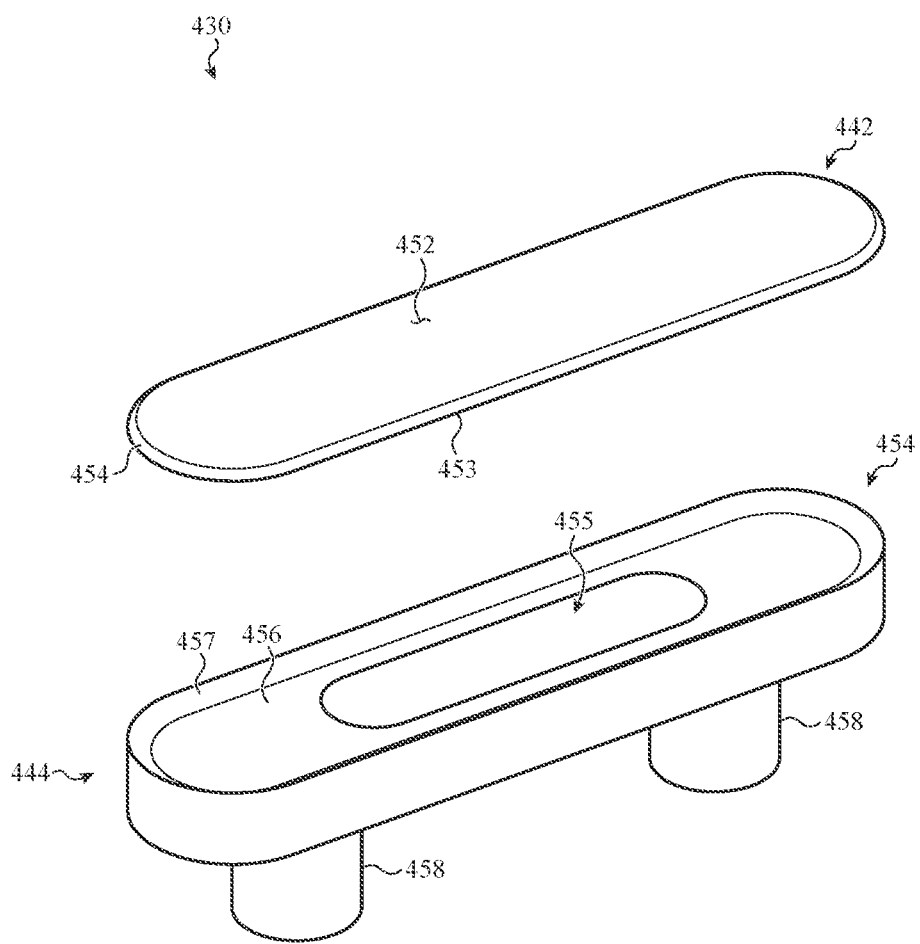
FIG. 4 shows a partial exploded view of another example biometric button assembly.

FIG. 4 shows a partial exploded view of another biometric button assembly 430. The biometric button assembly 430 is part of a biometric input system, which may be similar to the biometric input systems 124 and 224 described with respect to FIGS. 1A, 1B, and 2. The biometric button assembly 430 includes a package 442 and a carrier structure 444.

In embodiments, the package 442 includes a biometric sensing component that is at least partially encased by a composite material as described herein. An outer layer of the package may be formed of this composite material and define an input surface 352 for the biometric input system. An outer layer of the package may be formed of a composite material as described herein and define an input surface 452 for the biometric input system. The outer layer of the package may also be referred to herein as an outward-facing layer or as an exterior layer. The composite material may therefore form a composite cap (alternately, cover) for the biometric button assembly. The package 442 also defines a lower surface 453 and a side surface 454. The package may also include one or more other components of the biometric input system, such as a circuit layer, a circuit component (e.g., a processor) operatively coupled to the biometric sensing component, or a passive component. The cross-sectional views of FIGS. 6B-10 show examples of the types and configurations of components that may be included in the package and the description provided with respect to FIGS. 6B— 10 is generally applicable herein.

The carrier structure 444 is typically coupled to the package 442. For example, a region of the lower surface 453 of the package 442 may be coupled to the carrier structure 444 by an adhesive. In some cases, a region of the side surface 454 of the package 442 may be coupled to the carrier structure 444. The carrier structure 444 may be formed of an electrically conductive material, such as a metal (including a metal alloy). In some cases, the carrier structure 444 may be coupled to a circuit ground of the electronic device. In other cases, a voltage may be applied between the carrier structure 444 and a circuit ground. In some embodiments the carrier structure 444 may be substantially stationary in response to input from a user while in other embodiments, the carrier 444 may translate in response to the input from the user.

In the example of FIG. 4, the carrier structure 444 includes a frame portion 454. The frame portion 454 may define an opening 455 and the package 442 may span the opening 455. In the example of FIG. 4, a central region 456 of the frame 454 defines the opening 455 and is positioned inward from (alternately, underneath) the lower surface 453 of the package 442. A peripheral region 457 of the frame 442 extends along the side surface 454 of the package 442. The peripheral region 457 may define a ring around the package 442. In some cases, the peripheral region 457 may extend to the height of the input surface 452 of the package, so that a user's finger may come in contact with the peripheral region 457. In such cases, the peripheral region 457 may provide a connection between a user's finger (when the finger is in contact with the peripheral region 457 of the frame 442) and a circuit ground of the electronic device. When the carrier structure 444 is substantially stationary in response to input from a user, the ring defined peripheral region 457 may also be substantially stationary in response to the input from the user.

In the example of FIG. 4, the carrier structure 444 also includes multiple protruding features (e.g., bosses) 458 coupled to the frame portion 442. In some cases, the frame portion 442 and the protruding features 458 are formed as an integral piece. The protruding features 458 may be coupled to additional portions of the biometric system. For example, the protruding features may be coupled to a compressible assembly configured to transfer an input force applied to the input surface 452 to an input sensor. In other examples, the carrier structure may lack protruding features or may have protruding features that shaped differently than shown in FIG. 4.

FIG. 5 shows a partial cross-sectional view of a portion of a biometric input system 524. The cross-section may be taken along A-A in FIG. 2. The biometric input system 524 includes a button assembly 530 that includes a package 542 coupled to a carrier structure 544. As previously discussed, an outer layer of the package may define a button cap for the button assembly. The biometric input system 524 also includes an input sensor 548 capable of being actuated in response to a force applied to the button cap. In some cases, the input sensor 548 may be a switch assembly, which may include a dome switch or another type of electromechanical switch. In other cases, the input sensor 548 may be a force sensor, or a component of force sensor (e.g., a strain gauge, a piezoelectric or piezoresistive material, a capacitive force sensor, or the like). The force sensor can produce an output that varies in accordance with an amount of applied force. For example, the force sensor may have a continuous or variable output. The force sensor may have one or more programmable thresholds that trigger a corresponding action.

In embodiments, the button cap is capable of translating (i.e., moving) inward in response to a force-based input. In the example of FIG. 5, the carrier structure 544 includes a plate 546 configured to interact with the input sensor 548 when the button cap is depressed. In some cases, the input sensor 548 includes a compressible element, such as a compressible dome, which allows the button cap to move inwards in response to the force-based input and can impart a biasing force to cause the button cap to return to an undepressed condition after the force-based input is removed. The input sensor 548 is supported by a support 549. The support 549 may be coupled to the housing 510. In additional examples, the biometric input system may include a compressible assembly that is configured to compress in response to a user force input (e.g., a press input). The compressible assembly may be coupled to the carrier structure and helps to control the movement of the button cap when a force input is provided. The compressible assembly may include a spring, a scissors mechanism, a butterfly mechanism, or the like. In some cases, the compressible assembly may provide a return force.

As previously discussed with respect to FIGS. 1A and 1B, the package 542 includes a biometric sensing component. The package 542 may also include other components as described with respect to FIGS. 6A to 10. The carrier structure 544 includes a frame 555 and posts 558. The carrier structure 544, frame 555, and posts 558 may be similar to the carrier structures 344 and 444, the frames 355 and 455, and the posts 358 and 458 previously described with respect to FIGS. 3 and 4.

The button assembly 530 is at least partially positioned in an opening 515 of the housing 510. The opening 515 may be defined by a hole that extends through the housing. In the example of FIG. 5, the exterior surface of the housing 510 defines a recessed portion, with this recessed portion defining a recess 514. The recessed portion of the exterior surface also defines a perimeter of the opening 515. In the example of FIG. 5, the input surface 552 is positioned within the recess, which can provide help protect the input surface 552 from an impact to the exterior surface of the housing while still allowing a user to provide a touch or press input to the input surface 552. In other examples, the input surface 552 may be positioned at a bottom of the recess or the exterior surface of the housing 510 need not define a recess.

FIG. 6A shows an example of a package for a biometric input system. The package 642 includes a biometric sensing component 662 and a composite material 682 that at least partially encases the biometric sensing component, as shown in the partial cross-sectional view of FIG. 6B. The package 642 may be coupled to a carrier structure as previously described with respect to the biometric button assemblies of FIGS. 3 and 4.

The package 642 defines an input surface 652 of the biometric input system. The input surface 652 may be located along an outer surface of the package, which may also be referred to herein as an outward-facing surface or as an exterior surface. The composite material 682 may define the outer surface of the package. The composite material may also define an outer layer of the package, which may also be referred to herein as an outward-facing layer or as an exterior layer. In some cases, the outer layer of the package may be in the form of a coating of the composite material 682 (e.g., a dielectric coating).

The package 642 also includes a circuit layer 664. As shown in FIG. 6A, the circuit layer 664 is at least partially encased by the composite material 682. The circuit layer 664 may be a printed circuit board and the biometric sensing component 662 may be mounted to the printed circuit board (PCB). The printed circuit board may include one or more layers of conductive traces and one or more substrate layers.

An inward-facing (i.e., interior) surface of the circuit layer is at least partially encased by a molding compound 684, which may be a conventional encapsulation material. The biometric input system may also include an input sensor, plate or compressible assembly and/or other components as previously described with respect to the biometric input system of FIG. 5.

The composite material 682 may differ from conventional materials used for encapsulating electronic devices. For example, the size of the particles in the composite material may be smaller than the micrometer-sized filler materials used in some conventional molding compounds. In some examples, a mean particle size of the particles in the composite material 682 is greater than or equal to 50 nm and less than or equal to 1 micrometer.

In some cases, the composite material may be formulated to provide a balance of mechanical properties and dielectric properties. The composite material may also be formulated to provide a suitable coefficient of thermal expansion and resistance to water uptake. For example, the composite material may be formulated to provide a substantially uniform relative permittivity over the biometric sensing component. In some cases, the relative permittivity over the biometric sensing component is uniform to within +/−1%, +/−2%, +/−5% or +/−10%. The desired level of uniformity of the relative permittivity may be achieved by one or more of: using particles that are small relative to the size of pixel or sensing element of the biometric sensing component; providing a substantially homogeneous distribution of the predominant particles within the composite (e.g., the abrasion resistant particles described below); or providing a substantially uniform thickness of the composite material over the biometric sensing component. In some cases, the pixel or sensing element may have a lateral dimension from 20 micrometers to 100 micrometers, from 40 micrometers to 80 micrometers, or around 50 micrometers. In some examples, a mean particle size of the particles is from 20 nm to 750 nm, greater than or equal to nm and less than or equal to 1 micrometer, greater than or equal to 50 nm and less than or equal to 500 nm, from 100 nm to 750 nm, or from 100 nm to 500 nm. As previously mentioned, the desired level of uniformity may be provided at least in part by providing a substantially uniform thickness of the composite material over the biometric sensing component. In some embodiments, thicker layers of composite material may have a smaller allowable thickness variation as compared to thinner layers of the composite material. In some cases, the allowable thickness variation is +/−1% or +/−2% (e.g., for the thicker layers described below. In other cases, the allowable thickness variation may be up to +/−5% or +/−10% (e.g., for the thinner layers described below.

To provide strength and scratch resistance to the composite cap, the particles may be formed of an abrasion resistant material. The abrasion resistant material may be an inorganic material such as a ceramic or a mineral. The inorganic material may be a dielectric material. In some cases, the particles may be oxide particles. The oxide particles may be one or more of silicon oxide particles (such as silica, $SiO_2$) or metal oxide particles. In some cases, the metal oxide particles may be aluminum oxide particles (e.g., alumina, $Al_2O_3$), titanium oxide particles, or the like. The particles are distributed in a polymer material that binds together the particles, also referred to herein as a polymer binder.

The composite material may include a high loading of these particles in the polymer binder, such as 80% to 90% by weight or 80% to 95% by weight, in order to provide the desired mechanical and dielectric properties to the composite material. In some cases, the strength may be characterized by a modulus which indicates a resistance to deformation. For example, the composite material may have a modulus (e.g., a Young's modulus) that ranges from 10 GPa to 25 GPa, or from 15 GPa to 20 GPa. In some examples, the composite material may have a dielectric constant (relative permittivity) that ranges from 3 to 10, from 3 to 5, or from 7 to 10.

The polymer binder of the composite material also contributes to the dielectric and mechanical properties of the composite material. The polymer binder may be a dielectric polymer material. The polymer binder may also help to provide a suitable coefficient of thermal expansion and help to provide resistance to water uptake. In some cases, polymer binder includes or is formed of a thermoset polymer material, such as an epoxy-based polymer material or a polyurethane-based polymer material. The composite material may be formed by curing a polymerizable mixture of a pre-polymer of the polymer binder and the abrasion resistant particles. The polymerizable mixture may have a sufficiently low viscosity to flow around the wire bond 663 without disturbing the bond. The polymerizable mixture may also include pigment particles in order to provide a desired color to the composite cap. In some cases, the color provided by the pigment particles may be stable against exposure to ultraviolet (UV) light. The weight percentage of the polymer binder may be from 10% to 20% or from 5% to 20%. In some cases, the particles and the polymer binder may together make up from 90% to 95% of the composite material.

The electrical connector 656 may be electrically coupled to the circuit layer 664. In some cases, the electrical connector 656 is a flexible circuit element, such as a flexible circuit board. The electrical connector 656 may conductively couple the biometric sensing component and the circuit layer 664 to other electronic components of the device.

FIG. 6B shows a partial cross-sectional view of a package 642 for a biometric input system. The view of FIG. 6B may be an example of partial cross-sectional view of the package 642 shown in FIG. 6A. As shown in FIG. 6B, the package 642 includes a biometric sensing component 662. The package 642 also includes a composite material 682 that at least partially encases the biometric sensing component and defines an input surface 652 of the biometric input system. The package 642 may also include an electrical connector 656 as shown in FIG. 6A, although this connector is not shown in the partial cross-section of FIG. 6B.

In embodiments, the biometric sensing component 662 relies on an electric field sensing technique, which may be a capacitance sensing technique. In other cases, the biometric sensing component relies on another sensing technique such as an ultrasonic sensing technique, a radio-frequency (RF) sensing technique, a thermal sensing technique, an optical sensing technique, or the like. As previously mentioned, in some embodiments the biometric sensing component is a field fingerprint sensing component for sensing details of a user's fingerprint. In some cases, the biometric sensing component may be a capacitive fingerprint sensing component.

In embodiments, the biometric sensing component 662 includes at least one sensing element and associated circuitry. The at least one sensing element may be provided in a sensing layer. For example, when the biometric sensing component 662 is an electric field sensing component the biometric sensing component 662 may include multiple electric field sensing elements, which may be provided as an array in one or more layers of the biometric sensing element 662. Capacitive sensing elements may be an example of electric field sensing elements. When the biometric sensing component 662 includes an array of capacitive sensing elements the biometric sensing component may be referred to as a capacitive sensing component. The biometric sensing component may be provided in the form of a semiconductor die. As shown in FIG. 6B, the biometric sensing component 662 defines an outward facing-surface 692, which may also be referred to as an exterior surface. The biometric sensing component 662 also defines an inward-facing surface 693 generally opposite to the outward facing-surface and a side surface 694 that extends between the surfaces 692 and 693.

The package 642 of FIG. 6B also includes a composite material 682 that at least partially encases the biometric sensing component 662. The composite material 682 defines an outer layer of the package, which may also be referred to herein as an outward-facing layer or as an exterior layer. The composite material 682 may therefore define a composite cap for the biometric input system. As shown in FIG. 6B, the composite material 682 substantially encapsulates the outward-facing surface 692 and the side surface 694 of the biometric sensing component 662. The composite material 682 also substantially encapsulates the wire bond 663 extending from the outward-facing surface 692. In some cases, the composite material may be molded over the biometric sensing component 662 and optionally over other elements of the package. In other cases, the composite material may be provided as a molded part which is then disposed over and coupled to the outward-facing surface 692 and at least a portion of the side surface 694 of the biometric sensing component.

As shown in FIG. 6B, the layer of the composite material 682 has a substantially uniform thickness $T_6$ over at least a portion of the outward-facing surface 692 of the biometric sensing component 662. A substantially uniform thickness of the cap may help to provide a reduced tolerance for a stack including components of the biometric input system. In the example of FIG. 6B, the thickness $T_6$ of this layer may be sufficiently large to protect the wire bond 663. In some cases, the thickness $T_6$ is at least 90 micrometers and may range from 90 micrometers to 200 micrometers or from 90 micrometers to 180 micrometers. In additional examples where the wire bond or other connector is bonded to the inward-facing (interior) surface 693 of the biometric sensing component, the thickness may be less, but may be greater than 1 micrometer, greater than 5 micrometers, or greater than 10 micrometers. For example, the thickness may range from 40 micrometers to less than 90 micrometers. The composite material 682 may be similar in composition, mechanical properties and other properties to the composite material described with respect to FIG. 6A and that description is not repeated here.

Figure 7:
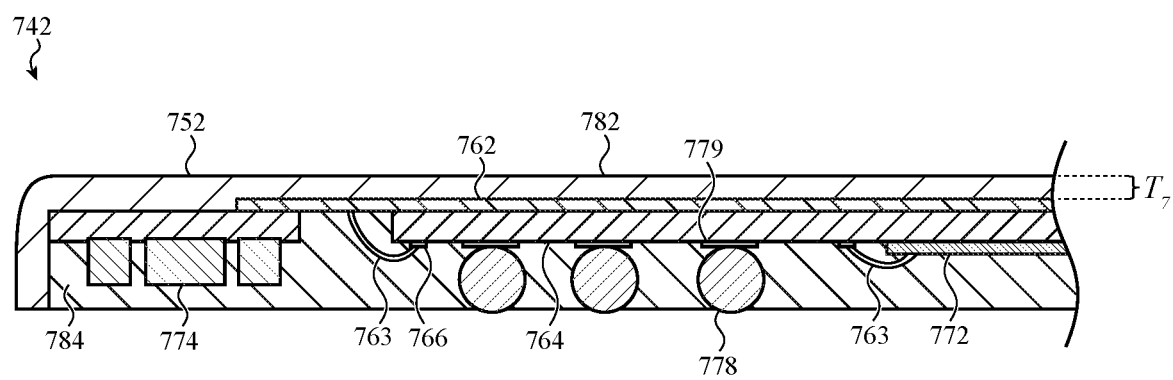
FIG. 7 shows another example of a partial cross-sectional view of a package for a biometric input system.
Figure 8:
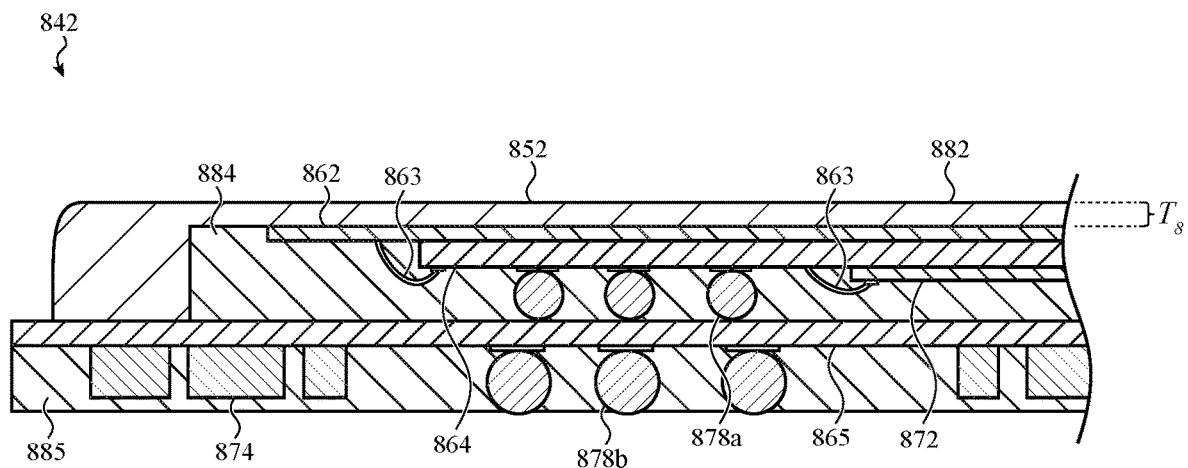
FIG. 8 shows another example of a partial cross-sectional view of a package for a biometric input system.
Figure 9:
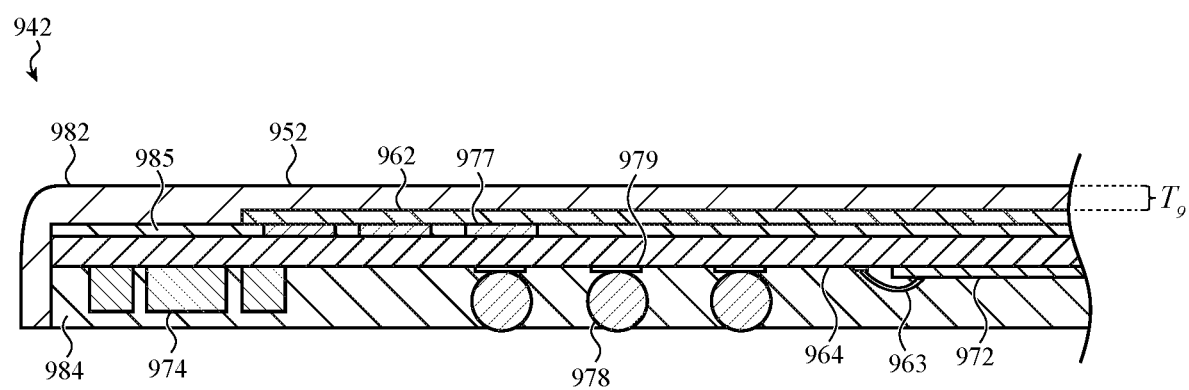
FIG. 9 shows another example of a partial cross-sectional view of a package for a biometric input system.

The package 642 also includes a circuit layer 664. The circuit layer 664 may be provided by a printed circuit board and the biometric sensing component 662 may be mounted to the printed circuit board (PCB). The biometric sensing component 662 is typically mounted to an outward-facing surface (also referred to as an exterior surface) 696 of the circuit layer 664. More specifically, an inward-facing surface 693 of the biometric sensing component is mounted to the outward-facing surface 696 of the circuit layer 664 as shown in FIG. 6B. The composite material 682 is also disposed over a portion of the outward-facing surface 696 of the circuit layer 664 in the example of FIG. 6B. The circuit layer also defines an inward-facing surface 697 and in some cases other components may be coupled to the inward-facing surface 697 and/or a molding compound, different than the composite material 682, may be disposed over the inward-facing surface 697 as illustrated in FIGS. 7-9.

Figure 10:
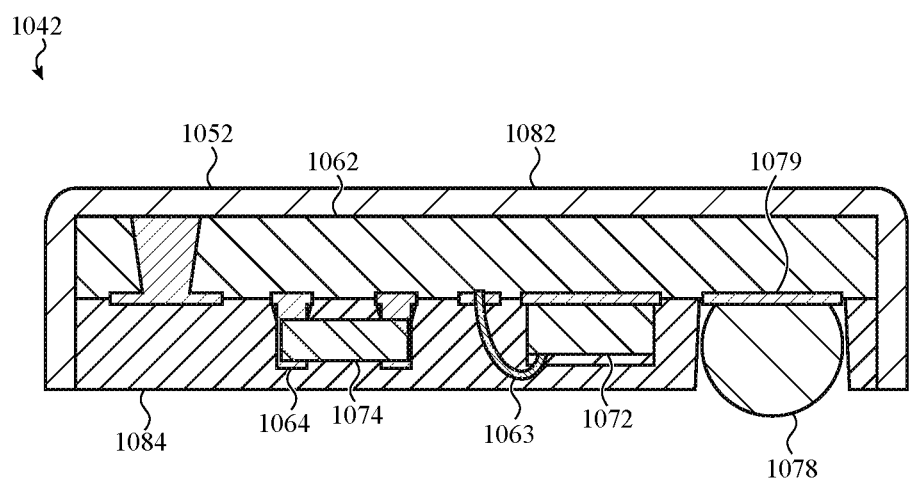
FIG. 10 shows another example of a partial cross-sectional view of a package for a biometric input system.

In the example of FIG. 6B, a wire bond 663 conductively couples the outward-facing surface 692 of the biometric sensing component 662 to the outward-facing surface 696 of the circuit layer 664. However, this example is not limiting and in additional examples the inward facing surface of the biometric sensing component may be conductively coupled to an inward-facing (interior) surface of the circuit layer by one or more wire bonds or to the outward-facing surface of the circuit layer by one or more solder bumps, as shown in the examples of FIGS. 7-9. In further examples, the circuit layer may be provided at least in part on the biometric sensing component as shown in the example of FIG. 10.

In some embodiments, the package 642 may include additional electronic components. For example, the package may include one or more additional active electronic components and/or one or more passive electronic components. One or more of these additional electronic components may be mounted on the circuit layer 664. In some cases, the package 642 may include a circuit component (e.g., the circuit component 772 of FIG. 7) that may be conductively coupled to the biometric sensing component 662. This circuit component may be in the form of a semiconductor die and in examples may include processors, memory, and/or other circuitry. When the biometric sensing component is a fingerprint sensing component, the circuit component may be conductively coupled to the capacitive elements (and/or other components of the fingerprint-sensing component) to facilitate fingerprint sensing.

In some embodiments, the package 642 may include a molding compound in addition to the composite material used to form the composite cap. The molding compound may make up an inner layer of the package, which may also be referred to herein as an interior package layer. For example, the molding compound may be used to encapsulate additional electronic components included in the package, to underfill a flip chip connection between the biometric sensing component and a printed circuit board, and the like. The molding compound may be a conventional molding compound. In some cases, the molding compound includes filler particles either distributed in a polymer matrix or bound together by a polymer binder, and therefore may be a composite material. However, the molding compound typically differs in one or more respects from the composite material 682. As previously discussed, the molding compound may include a filler that is larger in size than the particles included in the composite material 682. The molding compound may also differ in one or more of the filler composition and/or loading, the binder composition, the presence and/or the composition of any pigments, thermal properties, mechanical properties, or dielectric properties.

In some embodiments, the package 642 may be manufactured by a process that includes an operation of mounting the biometric sensing component 662 and other components of the package on the circuit layer 664. The assembly of the biometric sensing component 662, these other components, and the circuit layer may then be at least partially encapsulated by the molding compound to form an encapsulated assembly. As shown in the example of FIG. 6B, the molding compound 684 may encapsulate an inward-facing surface of the circuit layer 664 and a portion of the inward-facing surface of the biometric sensing component 662 while leaving the outward-facing surface of the biometric sensing component 662 and a least a portion of the outward-facing surface of the circuit layer 664 exposed. This process may be referred to as an open-faced molding process since the outward-facing surface of the biometric sensing component 662 is not covered by the molding compound 684.

The process then includes an operation of disposing the composite material over the encapsulated assembly, including an outward-facing surface of the biometric sensing component 662. When a coating of a composite material is disposed over the biometric sensing component, this operation may be referred to as an overmolding operation. In other examples the composite cap is formed and then attached to the biometric sensing component. In some cases, the composite material 682 may encapsulate the outward-facing surface of the biometric sensing component 662. For example, the composite material may be in direct contact with the outward-facing surface of the biometric sensing component and may conform to this outward-facing surface. The composite material may also encapsulate a portion of the outward-facing surface of the circuit layer 664. Portion of the molding material 684 may be removed at a later stage to allow a conductive connection to be made, such as when the molding material 684 encapsulates a solder ball.

The process may further include an operation of machining the composite material after it has been disposed over the biometric sensing component. For example, the machining operation may be used to control the thickness of the layer of the composite material over the outward facing surface and/or the side surface of the biometric sensing component. In addition, the machining operation may be used to control the shape of the cap, such as the shape of the perimeter of the exterior surface, a radius at the transition between an exterior surface and a side surface of the cap, a radius at the transition between the side surface of the cap and a layer of composite material disposed over the circuit layer, and the like. The machining operation can allow for sharp features and low (or no) draft angles (e.g., as compared to a cap shape formed solely by a molding process).

The package 642 may be coupled to a carrier structure as previously described with respect to the biometric button assemblies of FIGS. 3 and 4. The biometric input system may also include an input sensor, a plate or a compressible assembly and/or other components as previously described with respect to the biometric input system of FIG. 5 and that description is not repeated here.

FIG. 7 shows another example of a partial cross-sectional view of a package for a biometric input system, which may be another example of a partial cross-sectional view of the package 642 of FIG. 6A. As shown in FIG. 7, the package 742 includes a biometric sensing component 762. The package 742 also includes a composite material 782 that at least partially encases the biometric sensing component and defines an input surface 752 of the biometric input system. The package 742 may also include an electrical connector, which may be similar to the electrical connector shown in FIG. 6A, although this connector is not shown in the partial cross-section view of FIG. 7.

In some examples, the biometric sensing component 762 is an electric field sensing component, as previously discussed with respect to FIGS. 6A and 6B. In some cases, the biometric sensing component 762 may be a capacitive sensing component. The biometric sensing component 762 is mounted to an outward-facing surface of the circuit layer 764, which may be a circuit board as discussed with respect to FIG. 6A. In the example of FIG. 7, an inward-facing surface of the biometric sensing component 763 is conductively coupled to an inward-facing surface of the circuit layer 764 with a wire bond 763. As compared to the example of FIG. 6B, this interior positioning of the wire bond 763 does not require that the composite material 782 encapsulate the wire bond 763 and therefore can allow a thinner layer of the composite material 782 to be provided over the biometric sensing component 762. In some cases, the thickness $T_7$ of the layer of the composite material 782 may be less than 90 micrometers, such as from 40 micrometers to 90 micrometers. The wire bond 763 is coupled to a bond pad 766 on the circuit layer 764 in the example of FIG. 7.

A circuit component 772 is mounted to an inward-facing surface of the circuit layer 764. This circuit component may be in the form of a semiconductor die and in examples may include processors, memory, and/or other circuitry as previously discussed with respect to FIG. 6B. The package also includes passive components 774. The number, size, and positioning of these active and passive components is intended to be exemplary rather than limiting. The description of biometric sensing components, the circuit component, and passive components previously provided with respect to FIG. 6B is generally applicable herein and is not repeated here. The package 782 also includes solder balls 778, which are coupled to bond pads 779 in this example.

The package 782 also includes a molding compound 784 that encapsulates an inward-facing surface of the circuit layer 774 and various components and electrical connections mounted to and/or connected to the inward-facing surface. For example, the molding compound 784 encapsulates the circuit component 772, the passive components 774, the wire bonds 763, and at least partially encapsulates the solder balls 778. As previously discussed with respect to FIG. 6A, the molding compound 784 may differ from the composite material 782 and may be a conventional molding compound. The description of composite materials and molding compounds provided with respect to FIG. 6A is generally applicable herein and is not repeated here.

The package 742 may be coupled to a carrier structure as previously described with respect to the biometric button assemblies of FIGS. 3 and 4. The biometric input system may also include an input sensor, a plate or a compressible assembly and/or other components as previously described with respect to the biometric input system of FIG. 5.

FIG. 8 shows another example of a partial cross-sectional view of a package for a biometric input system, which may be another example of a partial cross-sectional view of the package 642 of FIG. 6A. As shown in FIG. 8, the package 842 includes a biometric sensing component 862. The package 842 also includes a composite material 882 that at least partially encases the biometric sensing component. The composite material 882 defines an input surface 852 of the biometric input system. The package 842 may also include an electrical connector, which may be similar to the electrical connector shown in FIG. 6A, although this connector is not shown in the partial cross-section view of FIG. 8.

In some examples, the biometric sensing component 862 is an electric field sensing component, as previously discussed with respect to FIGS. 6A and 6B. In some cases, the biometric sensing component 862 may be a capacitive sensing component. The biometric sensing component 862 is mounted to an outward-facing surface of the circuit layer 864, which may be a circuit board as discussed with respect to FIG. 6A. In the example of FIG. 8, an inward-facing surface of the biometric sensing component 862 is conductively coupled to an inward-facing surface of the circuit layer 864 with a wire bond 863. As previously explained with respect to FIG. 7, this interior positioning of the wire bond 863 does not require that the composite material 882 encapsulate the wire bond 863 and therefore can allow a thinner layer of the composite material 882 to be provided over the biometric sensing component 862 than in the example of FIG. 6B. In some cases, the thickness $T_8$ of the layer of the composite material 882 may be less than 90 micrometers, such as from 40 micrometers to 90 micrometers.

The package 842 is similar in many respects to the package 742. However, in the example of FIG. 8, the package includes a first circuit layer 864 and a second circuit layer 865 and components are arranged on both of these circuit layers. A circuit component 872 is mounted to an inward-facing surface of the first circuit layer 864. This circuit component may be in the form of a semiconductor die and in examples may include processors, memory, and/or other circuitry as previously discussed with respect to FIG. 6B. The package also includes passive components 874, which in the example of FIG. 8 are mounted to a second circuit layer 865, which may be similar to the first circuit layer 864. The number, size, and positioning of these active and passive components is intended to be exemplary rather than limiting. The description of biometric sensing components, the circuit component, and passive components previously provided with respect to FIG. 6B is generally applicable herein and is not repeated here.

The package 842 also includes a molding compound 884 that encapsulates an inward-facing surface of the first circuit layer 864 and various components and electrical connections mounted to and/or connected to this inward-facing surface as well as an outward-facing surface of the second circuit layer 865. For example, the molding compound 884 encapsulates the circuit component 872, the solder balls 878*a*, and the wire bonds 863 in the example of FIG. 8. The package 842 also includes a molding compound 885 that encapsulates an inward-facing surface of the second circuit layer 865, the passive components 874, and at least partially encapsulates the solder balls 878*b*. As previously discussed with respect to FIG. 6A, the molding compounds 884 and 885 may differ from the composite material 882 and may be conventional molding compounds. The molding compounds 884 and 885 may be the same material or in some cases may be different materials. The description of composite materials and molding compounds provided with respect to FIG. 6A is generally applicable herein and is not repeated here.

In some embodiments, the package 842 may be manufactured by a process that starts by mounting the biometric sensing component 862 and a first set of additional components of the package on the first circuit layer 864 and mounting a second set of additional components on the second circuit layer 864. The assembly of the biometric sensing component 862, the first and second sets of additional components and the first and the second circuit layers 864,865 may then be at least partially encapsulated by the molding compounds 884 and 885 in one or more encapsulation operations The process then includes an operation of disposing the composite material over the encapsulated assembly, including an outward-facing surface of the biometric sensing component 862. This operation may be referred to as an overmolding operation. In some cases, the composite material 882 may encapsulate the outward-facing surfaces of the biometric sensing component 862 and a portion of the outward-facing surface of the first circuit layer 864.

The package 842 may be coupled to a carrier structure as previously described with respect to the biometric button assemblies of FIGS. 3 and 4. The biometric input system may also include an input sensor, a plate or a compressible assembly and/or other components as previously described with respect to the biometric input system of FIG. 5.

FIG. 9 shows another example of a partial cross-sectional view of a package for a biometric input system, which may be another example of a partial cross-sectional view of the package 642 of FIG. 6A. As shown in FIG. 9, the package 942 includes a biometric sensing component 962. The package 942 also includes a composite material 982 that at least partially encases the biometric sensing component and defines an input surface 952 of the biometric input system. The composite material has a thickness $T_9$. The package 942 may also include an electrical connector, which may be similar to the electrical connector shown in FIG. 6A, although this connector is not shown in the partial cross-section view of FIG. 9.

The package 942 is similar in many respects to the package 742. However, in the example of FIG. 9 the biometric sensing component 962 is mounted to an outward-facing surface of the circuit layer 964 with a flip chip connection and the package 982 includes an underfill molding compound 985. The underfill molding compound 985 may encapsulate the solder bonds 977, a portion of the inward-facing surface of the biometric sensing component 962, and at least a portion of the outward-facing surface of the circuit layer 964. The molding compound 984 has a similar function and may be similar in composition to the molding compound 684 described with respect to FIG. 6A. The composite material 982 may be disposed over an outward-facing surface of the biometric sensing component 962 and a portion of the underfill molding compound, as well as over at least a portion of the side surface of the circuit layer 964. The description of composite materials and molding compounds provided with respect to FIG. 6A is generally applicable herein and is not repeated here. In some cases, the underfill molding compound 985 may have a different composition than the molding compound 984 in order to facilitate its flow into the gaps between the biometric sensing component 962 and the circuit layer 964. In some embodiments, the package 942 may be manufactured by a process similar to that described for the package 742.

A circuit component 972 is mounted to an inward-facing surface of the circuit layer 964. A wire bond 963 conductively couples the circuit component 972 to the circuit layer 964 in the example of FIG. 9. The package also includes passive components 974. The package 982 also includes solder balls 978, which are coupled to bond pads 979 in this example. The description of biometric sensing components, the circuit component, and passive components previously provided with respect to FIG. 6B is generally applicable herein and is not repeated here.

The package 942 may be coupled to a carrier structure as previously described with respect to the biometric button assemblies of FIGS. 3 and 4. The biometric input system may also include an input sensor, a plate or a compressible assembly and/or other components as previously described with respect to the biometric input system of FIG. 5.

FIG. 10 shows another example of a partial cross-sectional view of a package for a biometric input system, which may be another example of a partial cross-sectional view of the package 642 of FIG. 6A. As shown in FIG. 10, the package 1042 includes a biometric sensing component 1062. The package 1042 also includes a composite material 1082 that at least partially encases the biometric sensing component and defines an input surface 1052 of the biometric input system. The package 1042 may also include an electrical connector, which may be similar to the electrical connector shown in FIG. 6A, although this connector is not shown in the partial cross-section view of FIG. 10.

In the example of FIG. 10, the package 1042 does not include a circuit layer in the form of a circuit board. Instead, the circuit layer 1064 is formed at least in part along an inward-facing surface of the biometric sensing component 1062. Additional components of the package, such as the circuit component 1072 and a passive component 1074, are mounted on the inward-facing surface of the biometric sensing component 1062 so that they are conductively coupled to the circuit layer 1064. A wire bond 1063 couples the circuit component 1072 to the circuit layer 1064. The package 1042 also includes a solder ball 1078 coupled to a bonding pad 1079. A molding compound 1084 at least partially encapsulates the inward-facing surface of the biometric sensing component and a composite material 1082 at least partially encapsulates the outward-facing surface of the biometric sensing component. The biometric sensing component 1062, the circuit component 1072, the passive component 1074, the composite material 1082, and the molding compound 1084 may be as previously described with respect to FIGS. 6A and 6B and that description is not repeated here.

The package 1042 may be coupled to a carrier structure as previously described with respect to the biometric button assemblies of FIGS. 3 and 4. The biometric input system may also include an input sensor, a plate or a compressible assembly and/or other components as previously described with respect to the biometric input system of FIG. 5.

Figure 11:
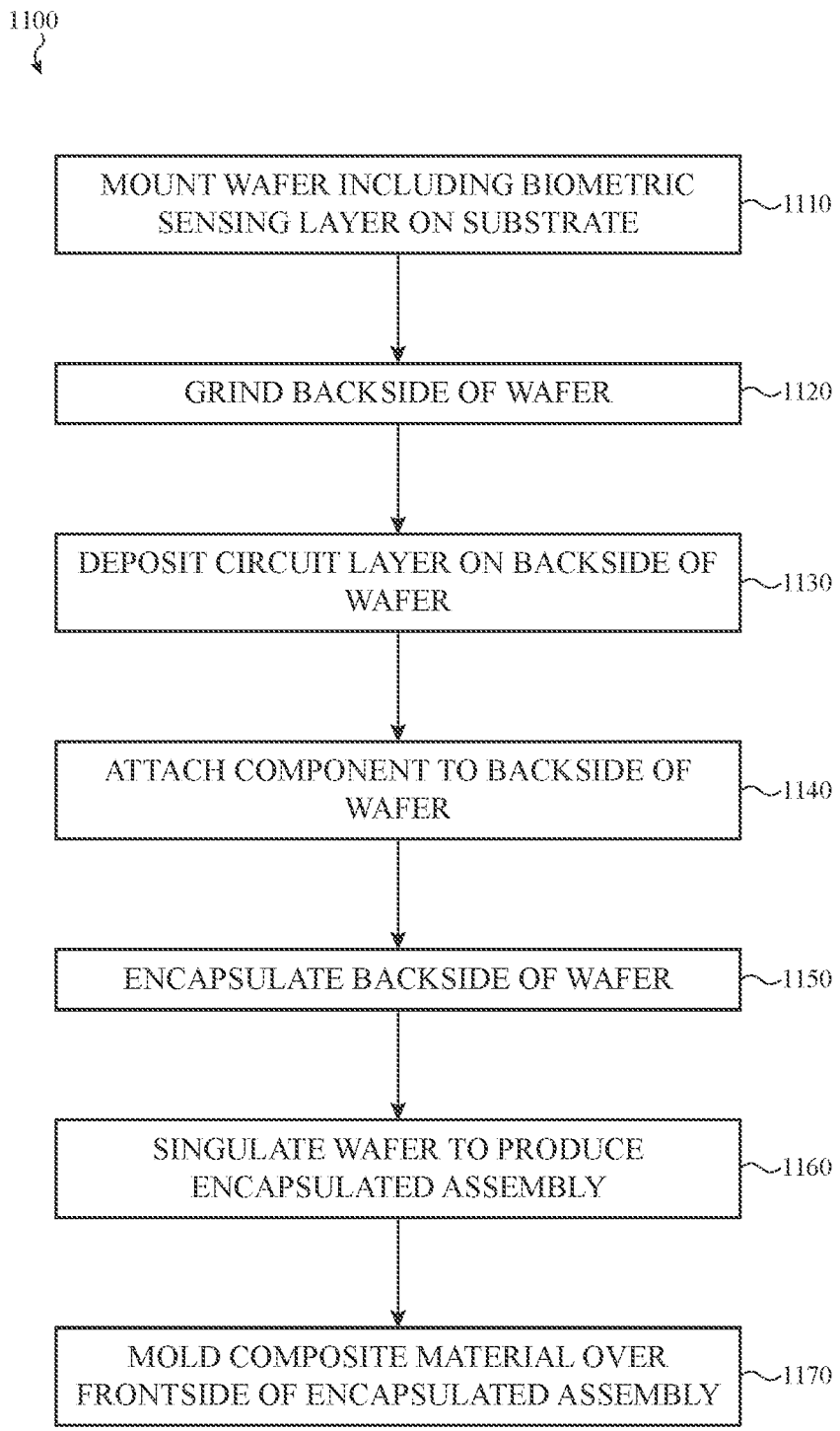
FIG. 11 shows a flow chart of a process for making the package.

FIG. 11 shows a flow chart of a process 1100 for making the package. In the process 1100, the circuit layer is formed on a wafer rather than being provided by a circuit board. In some examples, the process 1100 can be used to make the package 1042 shown in FIG. 10.

The process 1100 begins with an operation 1110 of mounting a wafer including a sensing layer on a carrier. Typically, the wafer includes multiple sensing layers, and the wafer is singulated to produce individual biometric sensing components, as described in further detail with respect to the operation 1160. A side of the wafer that will form the exterior surface of the biometric sensing component is mounted on the carrier film. With respect to FIG. 11, this side of the wafer may be referred to as a front side.

In an operation 1120, a side of the wafer that will form an interior surface of the biometric sensing component may be ground to remove material. With respect to FIG. 11, this side of the wafer may be referred to as a back side. In some cases, the operation 1120 may expose a conductive via in the wafer.

In an operation 1130, a circuit layer may be deposited on the back side of the wafer. The circuit layer may be formed by alternative deposition of dielectric and electrically conductive materials. For example, a first conductive layer may be formed from copper or a copper alloy while a second conductive layer may be formed from nickel, a nickel alloy, gold, or a gold alloy. In some cases, the circuit layer may define or include a redistribution layer.

In an operation 1140, components may be mounted to the back side of the wafer and conductively coupled to the circuit layer. For example, the operation 1140 may include mounting a circuit component and a passive component to the back side of the wafer (the interior-facing surface of the biometric sensing component in the example of FIG. 10). One or more connectors (e.g., a solder ball) may be conductively coupled to the circuit layer.

In an operation 1150, a molding compound may be used to encapsulate the back side of the wafer and the components mounted to the wafer (e.g., a circuit component and a passive component). In some cases, the molding compound may be ground after curing to expose part of a solder ball or other connector. If desired, some of the molding compound immediately surrounding the solder ball may be removed to allow the ground solder to re-form into a ball shape. FIG. 10 shows on example of a package in which molding compound immediately surrounding a solder ball has been removed.

In an operation 1160, the wafer may be singulated to form multiple encapsulated assemblies, each including a biometric sensing component. After singulation, the encapsulated assemblies may be removed from the carrier. The outward-facing surface of the biometric sensing component is exposed, rather than encapsulated, since front side of the wafer was in contact with the carrier during the operation 1150.

In an operation 1170, a composite material is molded over the outward-facing side of the biometric sensing component. As was shown in the example of FIG. 10, the composite material may form a layer over the outward-facing surface of the biometric sensing component and this layer of composite material may define an input surface for the biometric input system. This layer of composite material may also define a cap for the biometric input system. In some cases, the cap may extend over a side surface of the biometric sensing component as shown in the example of FIG. 10. The composite material may be as previously described with respect to FIG. 6A, and that description is not repeated here.

The process 1100 may also include an operation of machining the composite material following the operation 1170. For example, the machining operation may be used to control the thickness of the layer of the composite material over the outward facing surface and/or the side surface of the biometric sensing component. The thickness of the layer of the composite material may be similar to the thicknesses previously described with respect to FIGS. 6B and 7 and that description is not repeated here. In addition, the machining operation may be used to control the shape of the cap in a similar fashion as previously described with respect to FIG. 6B.

FIG. 12 shows a block diagram of an example electronic device. The schematic representation depicted in FIG. 12 may correspond to components of the devices depicted in FIGS. 1A to 2 as described above. However, FIG. 12 may also more generally represent other types of electronic devices including a biometric input system as described herein.

In embodiments, an electronic device 1200 may include sensors 1220 to provide information regarding configuration and/or orientation of the electronic device in order to control the output of the display. For example, a portion of the display 1208 may be turned off, disabled, or put in a low energy state when all or part of the viewable area of the display 1208 is blocked or substantially obscured. As another example, the display 1208 may be adapted to rotate the display of graphical output based on changes in orientation of the device 1200 (e.g., 90 degrees or 180 degrees) in response to the device 1200 being rotated.

The electronic device 1200 also includes a processor 1206 operably connected with a computer-readable memory 1202. The processor 1206 may be operatively connected to the memory 1202 component via an electronic bus or bridge. The processor 1206 may be implemented as one or more computer processors or microcontrollers configured to perform operations in response to computer-readable instructions. The processor 1206 may include a central processing unit (CPU) of the device 1200. Additionally, and/or alternatively, the processor 1206 may include other electronic circuitry within the device 1200 including application specific integrated chips (ASIC) and other microcontroller devices. The processor 1206 may be configured to perform functionality described in the examples above.

The memory 1202 may include a variety of types of non-transitory computer-readable storage media, including, for example, read access memory (RAM), read-only memory (ROM), erasable programmable memory (e.g., EPROM and EEPROM), or flash memory. The memory 1202 is configured to store computer-readable instructions, sensor values, and other persistent software elements.

The electronic device 1200 may include control circuitry 1210. The control circuitry 1210 may be implemented in a single control unit and not necessarily as distinct electrical circuit elements. As used herein, "control unit" will be used synonymously with "control circuitry." The control circuitry 1210 may receive signals from the processor 1206 or from other elements of the electronic device 1200.

As shown in FIG. 12, the electronic device 1200 includes a battery 1214 that is configured to provide electrical power to the components of the electronic device 1200. The battery 1214 may include one or more power storage cells that are linked together to provide an internal supply of electrical power. The battery 1214 may be operatively coupled to power management circuitry that is configured to provide appropriate voltage and power levels for individual components or groups of components within the electronic device 1200. The battery 1214, via power management circuitry, may be configured to receive power from an external source, such as an alternating current power outlet. The battery 1214 may store received power so that the electronic device 1200 may operate without connection to an external power source for an extended period of time, which may range from several hours to several days.

In some embodiments, the electronic device 1200 includes one or more input devices 1218. The input device 1218 is a device that is configured to receive input from a user or the environment. The input device 1218 may include, for example, a push button, a touch-activated button, a capacitive touch sensor, a touch screen (e.g., a touch-sensitive display or a force-sensitive display), a capacitive touch button, dial, crown, or the like. In some embodiments, the input device 1218 may provide a dedicated or primary function, including, for example, a power button, volume buttons, home buttons, scroll wheels, and camera buttons.

The device 1200 may also include one or more sensors or sensor components 1220, such as a force sensor, a capacitive sensor, an accelerometer, a barometer, a gyroscope, a proximity sensor, a light sensor, or the like. In some cases, the device 1200 includes a sensor array (also referred to as a sensing array) which includes multiple sensors 1220. For example, a sensor array associated with a protruding feature of a cover member may include an ambient light sensor, a Lidar sensor, and a microphone. As previously discussed with respect to FIG. 1B, one or more camera components may also be associated with the protruding feature. The sensors 1220 may be operably coupled to processing circuitry. In some embodiments, the sensors 1220 may detect deformation and/or changes in configuration of the electronic device and be operably coupled to processing circuitry that controls the display based on the sensor signals. In some implementations, output from the sensors 1220 is used to reconfigure the display output to correspond to an orientation or folded/unfolded configuration or state of the device. Example sensors 1220 for this purpose include accelerometers, gyroscopes, magnetometers, and other similar types of position/orientation sensing devices. In addition, the sensors 1220 may include a microphone, an acoustic sensor, a light sensor (including ambient light, infrared (IR) light, ultraviolet (UV) light), an optical facial recognition sensor, a depth measuring sensor (e.g., a time of flight sensor), a health monitoring sensor (e.g., an electrocardiogram (erg) sensor, a heart rate sensor, a photoplethysmogram (ppg) sensor, a pulse oximeter, a biometric sensor (e.g., a fingerprint sensor), or other types of sensing device.

In some embodiments, the electronic device 1200 includes one or more output devices 1204 configured to provide output to a user. The output device 1204 may include a display 1208 that renders visual information generated by the processor 1206. The output device 1204 may also include one or more speakers to provide audio output. The output device 1204 may also include one or more haptic devices that are configured to produce a haptic or tactile output along an exterior surface of the device 1200.

The display 1208 may include a liquid-crystal display (LCD), a light-emitting diode (LED) display, an LED-backlit LCD display, an organic light-emitting diode (OLED) display, an active layer organic light-emitting diode (AMOLED) display, an organic electroluminescent (EL) display, an electrophoretic ink display, or the like. If the display 1208 is a liquid-crystal display or an electrophoretic ink display, the display 1208 may also include a backlight component that can be controlled to provide variable levels of display brightness. If the display 1208 is an organic light-emitting diode or an organic electroluminescent-type display, the brightness of the display 1208 may be controlled by modifying the electrical signals that are provided to display elements. In addition, information regarding configuration and/or orientation of the electronic device may be used to control the output of the display as described with respect to input devices 1218. In some cases, the display is integrated with a touch and/or force sensor in order to detect touches and/or forces applied along an exterior surface of the device 1200.

The electronic device 1200 may also include a communication port 1212 that is configured to transmit and/or receive signals or electrical communication from an external or separate device. The communication port 1212 may be configured to couple to an external device via a cable, adaptor, or other type of electrical connector. In some embodiments, the communication port 1212 may be used to couple the electronic device 1200 to a host computer.

The electronic device 1200 may also include at least one accessory 1216, such as a camera, a flash for the camera, or other such device. The camera may be part of a camera array or sensing array that may be connected to other parts of the electronic device 1200 such as the control circuitry 1210.

As used herein, the terms "about," "approximately," "substantially," "similar," and the like are used to account for relatively small variations, such as a variation of +/−10%, +/−5%, +/−2%, or +/−1%. In addition, use of the term "about" in reference to the endpoint of a range may signify a variation of +/−10%, +/−5%, +/−2%, or +/−1% of the endpoint value. In addition, disclosure of a range in which at least one endpoint is described as being "about" a specified value includes disclosure of the range in which the endpoint is equal to the specified value.

As used herein, the phrase "one or more of" or "at least one of" or "preceding a series of items, with the term "and" or "or" to separate any of the items, modifies the list as a whole, rather than each member of the list. The phrase "one or more of" or "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "one or more of A, B, and C" or "one or more of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

The following discussion applies to the electronic devices described herein to the extent that these devices may be used to obtain personally identifiable information data. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. An electronic device comprising:
    an enclosure;
    a display positioned within the enclosure; and
    a biometric button assembly positioned along a side of the display and comprising:
        a carrier structure configured to translate in response to a user press input;
        a switch assembly configured to detect a translation of the carrier structure in response to the user press input;
        a biometric sensing component coupled to the carrier structure and comprising an array of sensing elements configured to sense a fingerprint in response to the user press input; and
        a dielectric coating at least partially encapsulating the array of sensing elements of the biometric sensing component, defining an input surface for the biometric button assembly, and formed from a composite material comprising:
            oxide particles having a mean particle size greater than or equal to 50 nm and less than 1 micrometer; and
            a binder comprising a thermoset polymer material.

2. The electronic device of claim 1, wherein:
    the enclosure includes a housing and a cover defining a transparent window over the display;
    at least a portion of the biometric button assembly is positioned in an opening in the housing;
    each of the sensing elements of the array of sensing elements is a field sensing element; and
    the dielectric coating has:
        a thickness greater than 5 micrometers and less than or equal to 200 micrometers over an outer surface of the biometric sensing component; and
        an oxide particle loading that falls within a range from 80% to 90% by weight.

3. The electronic device of claim 2, wherein:
    the outer surface and at least a portion of a side surface of the biometric sensing component protrudes from the opening; and
    the dielectric coating encapsulates the outer surface and the portion of the side surface of the biometric sensing component.

4. The electronic device of claim 2, wherein:
    the biometric button assembly further comprises a circuit layer conductively coupled to the biometric sensing component;
    the biometric sensing component is mounted to an outward-facing surface of the circuit layer;
    the biometric button assembly further comprises a circuit component mounted to an inward-facing surface of the circuit layer and conductively coupled to the biometric sensing component through the circuit layer; and
    a molding compound, different from the composite material, at least partially encapsulates the circuit component and the inward-facing surface of the circuit layer.

5. The electronic device of claim 4, wherein:
    a connector conductively couples the outer surface of the biometric sensing component to the inward-facing surface of the circuit layer;
    the dielectric coating at least partially encapsulates the connector and the outward-facing surface of the circuit layer; and
    the thickness of the coating ranges from 90 micrometers to 200 micrometers.

6. The electronic device of claim 4, wherein:
    the dielectric coating defines an outer face of the biometric button assembly; and
    the outer face defines an elongated shape.

7. The electronic device of claim 1, wherein the switch assembly includes a dome switch.

8. An electronic device comprising:
    an enclosure defining an opening;
    a bio-authentication button assembly positioned at least partially within the opening and comprising:
        a capacitive sensing component defining a component surface; and
        a cap defining a touch input surface and disposed over the component surface, the cap formed from a composite material comprising:
            dielectric particles having a mean particle size greater than or equal to 50 nm and less than or equal to 500 nm; and
            a binder comprising a dielectric polymer material; and
    a processor positioned within the enclosure, operatively coupled to the capacitive sensing component, and configured to authenticate a user based on an output of the capacitive sensing component.

9. The electronic device of claim 8, wherein:
the touch input surface of the cap defines an elongated shape; and
the bio-authentication button assembly further comprises:
- a conductive carrier structure coupled to the capacitive sensing component; and
- a force sensor configured to detect a force applied to the touch input surface.

10. The electronic device of claim 9, wherein:
the touch input surface of the cap is proud of the opening; and
the composite material has a Young's modulus ranging from 15 GPa to 20 GPa.

11. The electronic device of claim 9, wherein a portion of the conductive carrier structure extends along a side surface of the capacitive sensing component.

12. The electronic device of claim 8, wherein:
the bio-authentication button assembly further comprises a circuit layer;
an inward-facing surface of the capacitive sensing component is conductively coupled to the circuit layer; and
the cap has a thickness ranging from 40 micrometers to 120 micrometers over an outward-facing surface of the capacitive sensing component opposite to the inward-facing surface.

13. The electronic device of claim 8, wherein:
the enclosure includes a housing and an at least partially transparent cover coupled to the housing and positioned over a display; and
the opening is defined by a hole that extends through the housing.

14. The electronic device of claim 13, wherein:
an exterior surface of the housing defines a recessed portion; and
the recessed portion defines a perimeter of the opening.

15. An electronic device comprising:
a housing defining an opening along a side surface of the electronic device;
a touch-sensitive biometric button assembly extending partially through the opening and comprising:
- a biometric sensing component including a sensing layer; and
- an exterior package layer defining an input surface of the touch-sensitive biometric button assembly, at least partially encapsulating an outward-facing surface of the biometric sensing component, and formed from a dielectric material comprising:
  - 80% to 95% by weight of oxide particles having a mean particle size greater than or equal to 50 nm and less than or equal to 500 nm; and
  - 5% to 20% by weight of a binder comprising a thermoset polymer material; and
a switch assembly positioned inward of the touch-sensitive biometric button assembly and configured to detect a user press input.

16. The electronic device of claim 15, wherein:
the touch-sensitive biometric button assembly further includes a carrier structure; and
the switch assembly includes:
- an electromechanical switch; and
- a compressible assembly coupled to the carrier structure and configured to compress in response to the user press input.

17. The electronic device of claim 15, wherein the sensing layer includes an array of field sensing elements.

18. The electronic device of claim 15, wherein the touch-sensitive biometric button assembly further includes:
a circuit layer; and
an interior package layer formed of a molding compound different from the dielectric material and at least partially encapsulating the circuit layer.

19. The electronic device of claim 18, wherein an inward-facing surface of the biometric sensing component defines a substrate for the circuit layer.

20. The electronic device of claim 15, wherein:
the oxide particles are silica particles; and
the thermoset polymer material is an epoxy-based polymer material.

* * * * *